United States Patent [19]

Roffinella et al.

[11] Patent Number: 4,841,523
[45] Date of Patent: Jun. 20, 1989

[54] METHOD OF ACCESSING LOCAL AREA NETWORKS WITH A UNIDIRECTIONAL RING-TRANSMISSION LINE, AND LOCAL AREA NETWORK USING THIS METHOD

[75] Inventors: Daniele Roffinella, Moncalieri; Maurizio Sposini, Turin, both of Italy

[73] Assignee: Cselt Centro Studi e Laboratori Telecomunicazioni S.p.A., Turin, Italy

[21] Appl. No.: 137,801

[22] Filed: Dec. 23, 1987

[51] Int. Cl.$^4$ .............................................. H04J 3/26
[52] U.S. Cl. .......................................... 370/89; 370/94
[58] Field of Search .................. 370/89, 86, 110.1, 94; 340/825.05, 825.5, 825.51

[56] References Cited

U.S. PATENT DOCUMENTS

| | | | |
|---|---|---|---|
| 4,538,263 | 8/1985 | Gabrielli et al. | 370/94 |
| 4,569,041 | 2/1986 | Takeuchi et al. | 370/94 |
| 4,663,758 | 5/1987 | Lambarelli et al. | 370/94 |
| 4,718,061 | 1/1988 | Turner | 370/89 |

*Primary Examiner*—Douglas W. Olms
*Attorney, Agent, or Firm*—Herbert Dubno

[57] ABSTRACT

A method of accessing a local-area network which allows transmission on a unidirectional ring, of circuit-switched or packet-switched communications organized in hybrid frames, in which overlapping between the beginning of a frame and a residual of the preceding frame which is still to reach its destination is avoided without reporting to a rigid band allotment to the indiviual communications and to a network synchronization system, where a well defined node acts as a master clock. According to the method the individual nodes of the network, access in sequence the transmission line in each frame, maintaining the same order of asynchronous access in the circuit and packet regions. To avoid overlapping between adjacent frames, in the packet region of each frame, starting from an instant preceding by a predetermined time period the end of the frame, the packet transmission by the node which has the right of access at the instant or by the nodes which would have the right of access from that instant to the end of the new frame, is disabled.

24 Claims, 15 Drawing Sheets

METHOD OF ACCESSING LOCAL AREA NETWORKS WITH A UNIDIRECTIONAL RING-TRANSMISSION LINE, AND LOCAL AREA NETWORK USING THIS METHOD

FIELD OF THE INVENTION

The present invention relates to local area networks and, more particularly, to an asynchronous method of accessing a local network having a unidirectional transmission-ring line. The invention also relates to a network using such a method.

BACKGROUND OF THE INVENTION

Wide-band local networks which are being investigated at the present time, join into a single system all the communication services within a firm. Hence, they must allow not only conventional speech and data services, but also new services such as computer-aided design or manufacturing (CAD,CAM), video conferencing, remote control of production processes, etc.

While implementing such service integration, it is important to obtain high efficiency (in terms of optimal exploitation of the available band), high flexibility (i.e. easy adaptability to new service introduction and to changes in the characteristics of the various services and/or of individual subscriber requirements) and high performance (in terms of network capacity and service quality). Reliability and cost must also be taken into account.

The requirements connected with the integration are met if the information emitted by the various sources is organized into cyc ically repeating hybrid frames and if ordered access protocols are used, e.g. as described in commonly owned Italian Patent Application No. 67856-A/84, filed on Aug. 28, 1984 corresponding to U.S. application Ser. No. 768,861 filed Aug. 23, 1985, now U.S. Pat. No. 4,663,758 in the case of a folded unidirectional bus network.

Such an access protocol presents intrinsic reliability advantages, since a failure preventing a station from transmitting merely results in the nonuse of the access right and is interpreted as a renunciation of transmission, without affecting the access by the other stations.

As to reliability aspects which depend on the network topology, the ideal solution would be a reconfigurable network, i.e. a network that, in the presence of a failure on the line or in one or more stations, may assume a topology permitting the interconnection of all or most of the still operating stations, cutting off the faulty line trunk and the faulty stations; this, however, considerably increases the complexity of the access-handling devices and, in the case of a ring network, also requires duplication of the transmission subsystem. Generally speaking, the higher the reliability degree, the greater will be the network costs.

Assuming the use of an access and transmission scheme where hybrid frames are employed to meet service integration requirements, a reasonable compromise between network costs and reliability degree may be of interest for some applications.

An example of such compromise can be represented by the office automation, where temporary activity interruption might also be tolerable. In this case, nonduplicated structures (e.g. a unidirectional ring) may be used, offering maximum implementing simplicity, since supervision and sensing of the activity on the line are coincident with the reception. For safeguard against network failures, taking into account that in the indicated application, such failures chiefly interest terminals and their links to the main line (e.g. as a consequence of possible terminal displacements), the transmission line could be housed in a protected duct and bypasses could be provided to cut off branches involved in failures.

Usually ring networks are based on token-passing protocols and packet-switching information flows. However, performance is inadequate to handle communications with continuity characteristics, such as speech communications, in terms of both efficiency and variance of transmission delay. Thus access schemes have been proposed using cyclical hybrid frames even on a ring. In this case, the main problem is to avoid overlapping of the beginning of a frame with a residual of the preceding frame which is still to reach the destination. In fact, by contrast with the folded unidirectional bus, writing and reading channels in a ring coincide, and hence each frame queue and the beginning of a subsequent one might be present at the same time on the same line section.

An example of a solution to this problem is described by K. Hiyama, H. Narisawa e H. Satou in the paper "An Integrated Services Optical Fiber Local Area Network" Σ Newtork"", Hitachi Review, Vol. 32 (1983) No. 4.

The solution suggested here, provides a synchronous network in which the frames are of fixed length, the two frame regions are subdivided into intervals of equal and constant duration, and the overall signal-propagation delay in the network (delay comprising both propagation time along the fiber and the operating time periods in the individual nodes) is made equal to or an integral multiple of the frame duration. The individual channels are allotted to the communications in one-to-one correspondence, according to a TDMA technique.

In the example described, the frame has a duration of 125 s and comprises 400 channels, each conveying 10 bits, 8 information bits and 2 control bits. The transmission rate is 32 Mbit/s, so that each channel has a 64 kbit/s capacity (in terms of information bits).

A structure of this type is scarcely efficient and scarcely suited to handle communications with different band requirements.

In fact, owing to the short frame duration, frame and control signals form a considerable portion (about 20%) of the signals to be transmitted, thus impairing transmission capacity of the actual information signals. Besides, the packet switched communications, which generally use transmission lines with a band of few kbit/s, are allotted a 64 kbit/s channel, which then remains partly unexploited. Conversely, for wide-band, circuit-switched communications, multiple assignment algorithms are to be defined, and, as is known, the higher the performance required, the greater is the complexity of such algorithms.

Finally, the network implementation is complicated by the strict relations between the frame length and the propagation delay. As a result, such a network is scarcely flexible, because a complete reorganization of frames and channels is required in case of architectural modifications.

OBJECTS OF THE INVENTION

It is an object of the invention to overcome these disadvantages in an accessing method, which does not resort to a rigidly slotted frame and allows the performance and flexibility desired by future applications to be obtained even at a high speed, together with architectural simplicity and hence reduced costs.

Another object is to provide an improved local area network (LAN) free from the above-described drawbacks.

SUMMARY OF THE INVENTION

According to the invention, a method for the asynchronous accessing of a high speed local-area network utilizes a LAN provided with a ring-transmission line, along which there is arranged a plurality of nodes with signal regeneration and on which the information transmitted is organized into hybrid frames formed by a zone allotted to communications with continuity requirements, referred to as the circuit region and a zone allotted to communications which do not have continuity requirements, referred to as the packet region. According to the method, the individual nodes of the network access in sequence the transmission line in each frame, maintaining the same order of asynchronous access in the circuit and packet regions. To avoid overlapping between adjacent frames, in the packet region of each frame, starting from an instant preceding by a predetermined time period the end of the frame, the packet transmission by the node which has the right of access at the instant or by the nodes which would have the right of access from that instant to the end of the new frame, is disabled.

Preferably, the predetermined time period is equal to the time (Tp) necessary for the information emitted by a node to return to the emitting node.

After the disabling in the circuit region of the new frame, the nodes resume accessing in the same order as that of the previous frame.

The time period (Tp) is counted only in a master node (Nn), which at each frame sends disabling signals to the other nodes after a time (Z-Tp) has expired from the beginning of a frame (z=frame duration).

The recognition of the disabling instant can, alternatively, be managed individually and independently by the individual nodes.

The value (Tp) of the predetermined time period can be communicated during an initialization phase to all of the nodes of the network and can be periodically updated by a network control center associated with one of the nodes.

In the variant of the latter operation, the value (Tp) of the predetermined time period can be communicated to each network node during the initialization phase by th network-control center and can be periodically updated by a master node.

In one mode of operation, master-node functions are taken up at each frame by the node whose packet transmission has been interrupted in the preceding frame upon expiration of the predetermined time (Tp), or by the first node having the right of access after that instant, in the case no node was transmitting.

Each active node can emit, at the end of its circuit or packet information or in place of such information, a signal (respectively, EAEC and EAEP) of end of activity and access-right recognition takes place b counting such signals and/or a guard time (Ta) indicating an isolated or faulty node.

Each node can recognize the access right by detecting the presence over the line of a token (T). Advantageously, the same token (T) is used for recognizing the access right in both frame regions. Alternatively, different tokens are used to recognize the access right in the circuit and packet region, respectively.

According to yet another embodiment of the invention, each active node emits at the end or in place of its packet or circuit activity, a signal of end-of-activity (respectively, EAEP and EAEC) and recognizes the right of access from the lack of activity after the signal (EAEP,EAEC) of end-of-activity. Each node then stores information indicating whether or not it has had the access during the frame, to recognize whether the access has occurred in the circuit or packet region.

According to another aspect of the invention, a LAN with a ring-transmission line, comprise a plurality of nodes with signal regeneration distributed along the line. Each such node of the LAN comprises a device managing the access to the line and arranged to implement the method.

Specifically, the managing device comprising means controlling the reception and transmission of the information relevant to packet-switched and/or circuit-switch communications; means for recognizing a right of access to the line; means for the suppression of the information which has completed the travel along the ring; and at least for a master node, a frame-signal generator generating commands for sending over the line suitably coded signals indicating significant events in the frame.

According to this invention, the managing device further comprises, for the master node at least, means for generating in the packet region of each frame, a signal indicating the instant of the beginning of an interval of predetermined duration extending up to the frame end and for disabling packet transmission by the nodes which have the right of access during that interval, a logic network recognizing the right of access into the two regions of the frame.

As indicated, the same node can always act as the master node. The means generating the disabling signal can be present or active only in the master node and can consist of the frame-signal generator constructed an arranged to broadcast the disabling signal to all of the other nodes.

Alternatively, the means generating the disabling signal can be present or active in all of the nodes and can generate the disabling signal signal only for the node that the disabling means belong to. In the latter case, the master node is the last to have the access during the frame, and the disabling signal (ABOTR) is represented by the command of emission of a start-of-frame flag, for the master node and by the output signal of a counter of the time (Z-Tp) for the other nodes. The functions of a master node in a frame can be taken up by the node which was transmitting at the moment of emission of the disabling signal during the preceding frame, or in case no node was transmitting, by the first node having the right of access during the interval. In that case, the node which becomes the master node transmits a start-of-frame flag together with a signal indicative of its identity. The signal disabling packet transmission can consist of the command of emission of the start-of-frame flag.

The logic network recognizing the right of access recognizes, in each region, the right of access of the node it belongs to, by counting signals emitted by a circuit which is part of the access-managing devices and is able to recognize and signal the occurred access of a node or the expiration of a guard time indicating the impossibility of such an access.

The logic network (AR2) for recognizing the right of access, alternatively, recognizes such a right on the basis of a token-passing mechanism. In this case, the device controlling the access comprises means for signalling to such recognition logic the presence on the line of a token (T) and the presenc of information to be transmitted by the node in either frame region, and for controlling the extraction from the line of the token (T) and its reemission over the line at the end of the transmission of the information.

According to still another embodiment, the logic recognizing the right of access recognizes the right of access of its node, because a signal indicating the end-of-activity of a node is not immediately followed by a signal indicating the beginning of the information relevant to a communication transmitted by another node. This logic comprises means storing information indicating whether or not the node has already obtained the access in the current frame to make a distinction between access in the circuit or packet region.

BRIEF DESCRIPTION OF THE DRAWING

The above and other objects, features and advantages of this invention will become more readily apparent from the following description, reference being made to the accompanying highly diagrammatic drawing in which.

SPECIFIC DESCRIPTION

Figure 1:
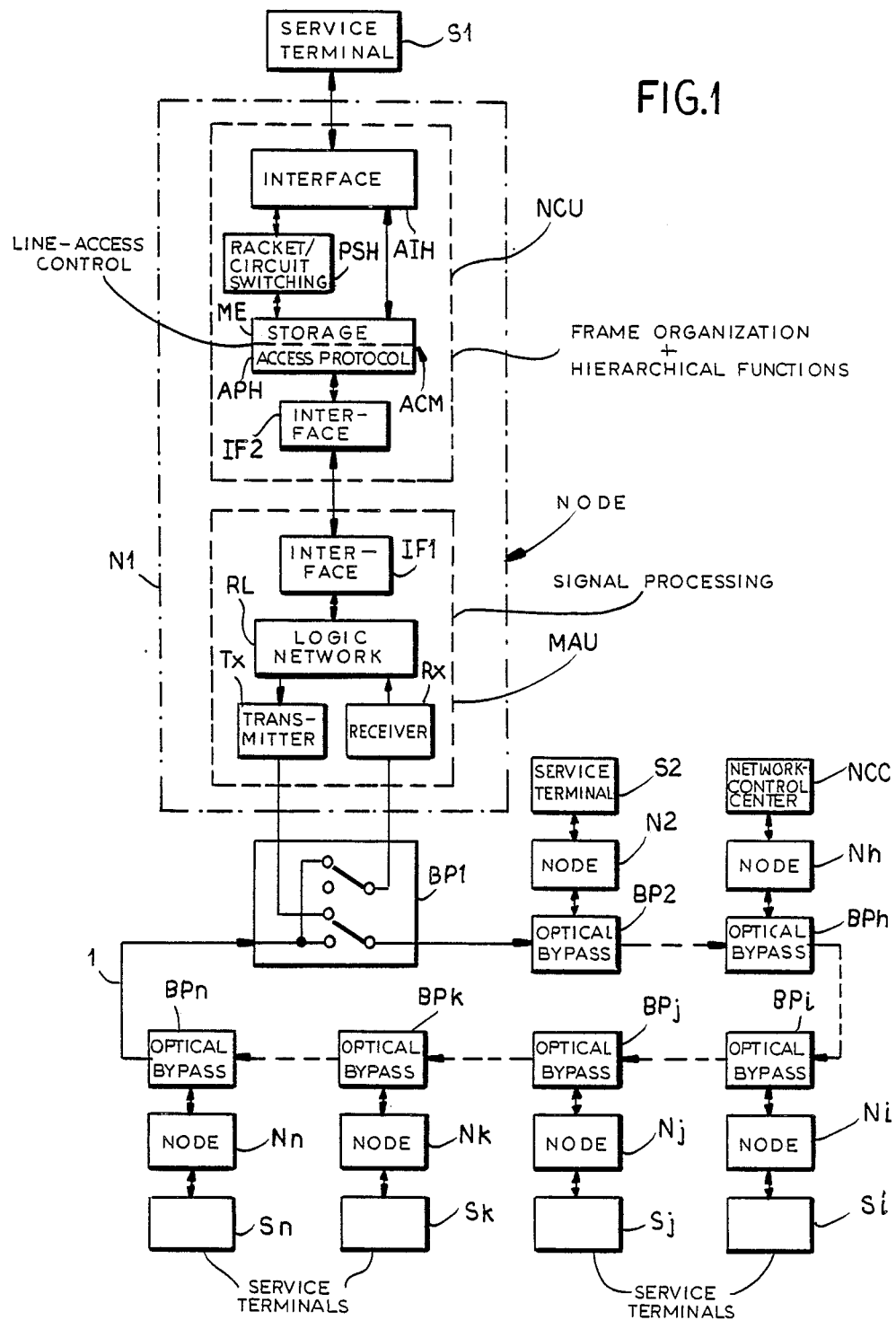
FIG. 1 is a diagram of a network according to the invention.

In FIG. 1, a local network comprises a wide-band unidirectional transmission line 1, consisting e.g. of an optical fiber, forming a closed ring along which devices N1, N2 ... Nh ... Ni ... Nj ... Nk ... Nn, hereinafter referred to as nodes, are located. At least one of these nodes, e.g. Nh, is connected to a so-called network-control center NCC, carrying out the functions which ought to be centralized (e.g. storage of tariffs, storage of the associations between subscribers and nodes, etc.).

A plurality of stations S1 ... Sn corresponding to one or more terminals for the different services the network can offer, are connected to the other nodes.

In the embodiment described here, the nodes are connected to line 1 by optical bypasses BP1 . . . BPn, cutting off the corresponding node in case of failure, in order to ensure transmission line continuity. Devices of this kind are commercially available.

Nodes N1 . . . Nn are active nodes and, as shown for N1, can be considered as composed of two parts: the first, denoted by MAU, comprises the devices necessary for reception, transmission and synchronization of signals (signal processing) transmitted on the line (physical level of the access protocol). The second part, NCU, comprises the devices which are to handle in distributed manner, the bus access protocol, to organize the information emitted by the sources into constant-duration hybrid frames (i.e. frames subdivided into two regions, one allotted to circuit-switched communications and the other to packet-switched communications) and, generally, to carry out higher hierarchical level functions required by standardized communications protocols.

Further details on the structure of MAU and NCU will be examined hereinafter.

Node access to the network and information transmission on line 1 take place with modalities derived from those described in the already-mentioned commonly-assigned U.S. patent application Ser. No. 768,861, filed Aug. 23, 1985.

More particularly, an ordered-access type protocol (of the "Round Robin" type), based on the physical allocation of the nodes along the network, is used.

According to this protocol, a number of rounds are established, and in every round all the nodes having information to be transmitted are allowed to intervene at least once, but no more than once: a given node, which can also vary from frame to frame, intervenes first, and the other nodes follow, in the order in which they are distributed along the ring with reference to the direction of transmission on the ring. Once also the last node has obtained the right of access, another round can begin.

A protocol of this type presents a high access efficiency and is not critically dependent on the network size and hence on the propagation time. Moreover it limits the transmission delay of a packet (sum of the access time, the transmission time and the propagation time) to a maximum predetermined value. The access in rounds concerns both circuit-switched and packet-switched communications; in this way a better integration of services is obtained and the structure of the communication control devices is highly simplified. As to circuit-switched communications, the frame will contain just one round during which each node is allotted the band actually required in that frame by the information to be transmitted; as to packet-switched communications, a frame will comprise a variable and even non-integral number of rounds, and the rounds possibly interrupted by the beginning of the circuit region of a new frame are resumed in the subsequent frame from the interruption point.

The activity period allotted to each node is shared among the various terminals (and hence the various communications) in such a way that they too send their information according to a predetermined order, which is maintained during the whole period of node activity.

The information is to be transmitted on the line with a coding, which permits sending the signals necessary to the protocol handling (commands) besides ensuring a good extraction of clock signal from the data flow. These requirements are satisfied, e.g. by CMI (Coded Mark Inversion) code, encoding bits 0 with 01 and bits 1, alternately, with 00 and 11.

By this code, each "command" can consist of an 8 bit word, wherein each of the first two bits and of the last two bits is transmitted with pair 10 (i.e. a configuration forming a code violation), while the other 4 bits denote the type of signal and will be transmitted with th configurations envisaged by the code. Inactivity periods are signalled by the presence of clock information only. Since the network is of active type, the modulated carrier will always be present and frame signals and/or commands will be explicitly transmitted.

In the embodiments in which the access order is kept for all the frames, all the nodes can be equipped with the frame-signal generator, even though the same node (master node) is always entrusted with frame-signal generation in a given network configuration. In this way, even though the master node becomes faulty or is cut off by its optical bypass BP, the network operation can go on, the master node tasks being transferred to another node, e.g. the following one.

Advantageously, the master node can be the last one which has access to the line, as this makes the circuit embodiment of some devices in NCU simpler, as will be seen hereinafter.

More particularly, the network can be initialized so that the node which accesses last, is the node connected to NCC or one node connected to NCC. Some initialization procedures can thus be simplified and, if only one unit NCC is provided, NCU can be further simplified by having a frame-signal generator only in the master node. This entails a certain performance degradation, since in case of a failure which affects just that node, the network cannot even end the communications in progress, since no further node can send frame signals.

However, costs are reduced, since there is a single frame-signal generator instead of a generator for each node.

In the embodiments in which the order by which the nodes are given, the right to access changes from frame to frame, the node which is to generate frame signals changes also and hence the presence in all the nodes of devices generating the frame signals is indispensable.

In a ring structure, information is to be suppressed after it has travelled along the whole ring, and overlapping between the last packet information in a frame, which is still to reach the destination, and the beginning of the following frame is to be avoided.

The information suppression is practically obtained by inhibiting retransmission. This will entail the presence of devices for recognizing the information to be suppressed and generating the inhibit command. Supposing that an information is suppressed by the node by which it has been generated, each node, after having inserted its information on the line, is to wait for the return thereof to effect the suppression. This gives rise in each node, to a period of inactivity whose duration is equal to the gross propagation time Tp along the ring (i.e. the actual propagation time of the signal along the fiber plus the delays introduced by the other nodes).

Different modalities are possible for detecting the information to be suppressed. For example, each node can suppress all items of information present on the line after the pause up to the first signal of the end-of-activity of a node. Alternatively, each node can transmit, before the actual information, a word coding its serial number and suppressing the information it has inserted and information derived from previous nodes which may have remained on line because of some failure. The first solution requires the master node to eliminate, besides its own information, all of the information which may possibly have remained on the line, because a node cannot be sure that it has suppressed its activity and not only that of a preceding node; yet that solution has the advantage of requiring no explicit indication of the node address. The second solution eliminates any doubt on the actual suppression by a node also of its own activity, yet it requires the presence of address decoders in each node.

As to the way of avoiding superposition between contiguous frames according to the invention, in the packet region of each frame, starting from an instant preceding by a predetermined time the end of the frame, the insertion of information on the line by the nodes, having right of access from that instant until the frame end, is inhibited.

The duration of this predetermined time is obviously counted started from the instant of recognition of the start-of-frame signal in the node.

More particularly, that predetermined time can be equal to propagation time Tp. This choice also ensures that the start-of-frame signal of the new frame is made immediately to follow the packet activity which has been transmitted before the interruption.

This anticipated activity interruption only requires the use of a time counter and can, therefore, be implemented without any difficulty.

If the clock signal regenerated in MAU is used as clock signal for the time counter, there is no danger of phase shifts among the counters in the different nodes and hence there is no risk of collision between packet-activity end and the start-of-frame signal.

Besides, by operating as described, superposition is avoided without requiring a rigid frame slotting and without adding inactivity time periods, so that a high efficiency can be maintained.

Coming back to the node structure, block MAU has been here schematically represented by receiver Rx and transmitter Tx (incorporating synchronism extracting means, clock-signal decoders and encoders of the received signal or of the signals to be transmitted, respectively, and the connection network allowing signal exchange between higher levels and the receiver or transmitter, or the forwarding or signals from Rx to Tx), and by an interface IF1 managing signal exchange between MAU and NCU.

Block NCU comprises interface IF2, complementary to IF1, a line-access control device ACM (entrusted also with the control of the operations connected with the suppression of information and the anticipated activity interruption), a device PSH controlling the packet-switched information traffic and circuit-switched communications signalling, and an interface AIH towards the stations or service terminals, separating or recombining the two kinds of traffic.

It is to be remembered, that information which flows relating to circuit-switched communications is directly supplied from AIH to ACM. Block ACM comprises access protocol control means APH and storage means ME. The latter means may comprise, e.g. two FIFO memories for packets to be transmitted or for received packets, respectively, and two sets of RAM memories for the information concerning circuit-switched communications outgoing from or entering the node.

The detailed descriptions of APH blocks are referred to this example.

Both block MAU and block NCU comprise a local control device, not shown in the drawing.

More particularly, the control device in MAU carries out the usual tasks of circuit initialization and supervision of the good functioning of transceivers of the buffer memory.

The control device of NCU, besides supervising the circuits of NCU, can carry out more general supervision or management tasks which do not directly concern the access, the signalling and the physical level of the protocol, and hence do not require immediate interventions, namely, statistical processings, error-signalling processings, detection of inactive remote station.

FIGS. 2–5 show two consecutive frames for the protocol embodiment in which the order of access is the same in all rounds. In the FIGURES, it has been supposed that information suppression is carried out by the node which has generated the information, that the master node is node Nn accessing last to the line and that no node is cutoff owing to a failure.

Figure 2:
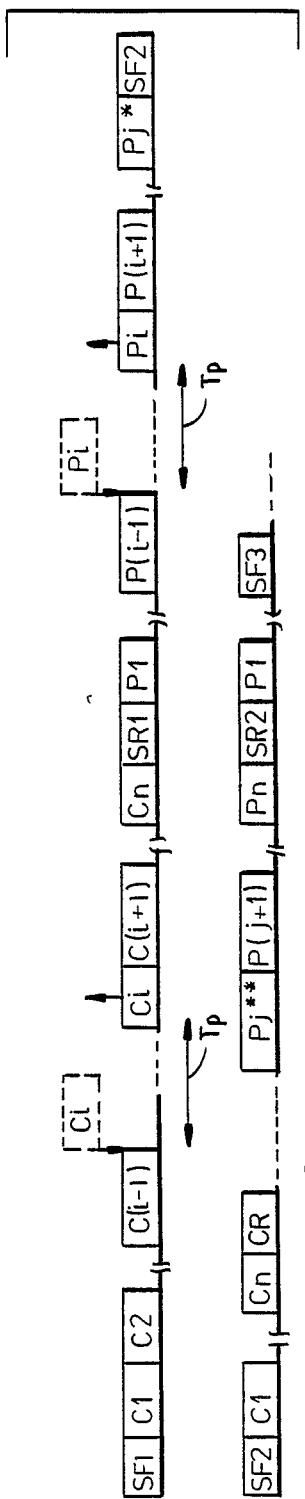
FIGS. 2 to 6 are examples of information organization according to a first embodiment of the access protocol.
Figure 3:
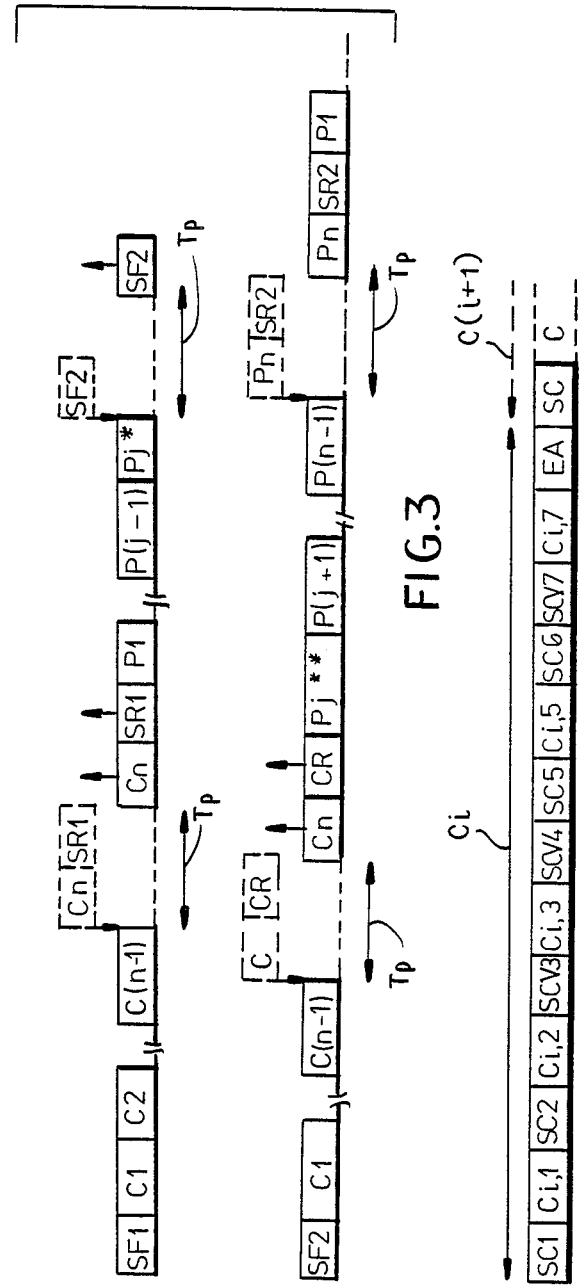

FIGS. 2–3 depict the case in which packet-activity in the first frame is interrupted while node Nj is given the right of access, and is completed in the second frame, during which also the round involved in the interruption is completed.

Figure 4:
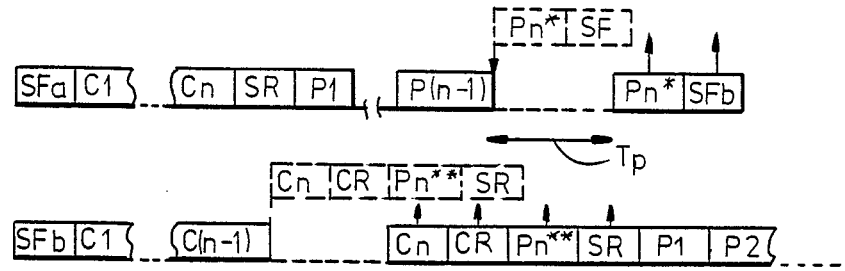
Figure 5:
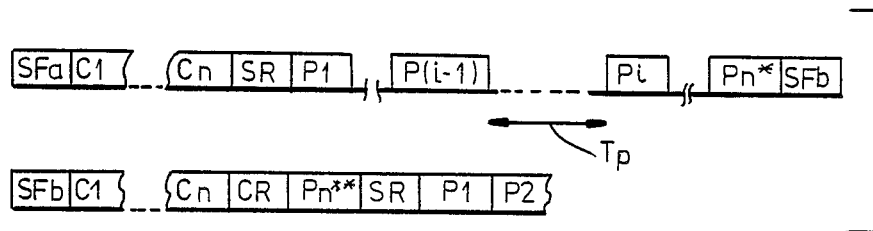

These Figures show the activity as detected at the receiver of a node Ni, which has access to the line prior to Nj, and of the master node Nn, which is given the access after Nj. The behavior of master node Nn does not greatly differ from that of any node accessing after Nj. FIGS. 4–5 depict, on the contrary, the case in which the activity is interrupted while node Nn is given the right of access, and show the activity detected at the receiver of Nn and at the receiver of another generic node Ni.

Figure 6:

In this embodiment, the commands necessary to the application of the access protocol are:

SF: Start-of-Frame (denoted by SF1, SF2, SFa, SFb in the different FIGS.);

SR: Start-of-Packet Round (denoted by SR1, SR2, SRa, SRb in the different FIGS.);

CR: Continuation of a packet round interrupted in the preceding frame;

SC: Start of a circuit with rigid management or of a packet (for rigid anagement circuits, we intend those allotted to communications requiring band allotment during their whole duration, independently of the existence of possible pauses, for example, non-speech communications requiring continuity, such as graphic facilities, video conferencing . . . );

SCV: Start of a circuit with dynamic management, e.g. by DSI (Digital Speech Interpolation) techniques for speech communications;

EA: End-of-Activity of a node: this signal is transmitted even though the terminals connected to the node have no information to transmit (signals SC, SCV, EA are shown in FIG. 6, showing in detail, a node activity).

In FIGS. 2–5, symbols Cx, Px (x=1 . . . n) indicate packet or circuit activity of the individual nodes, Pj*, Pj**, Pn*, Pn**, the packet activity of nodes Nj, Nn before and after the interruption; small blocks C, P represented by dashed line above the frame indicate the activity inserted by the node, and upwards oriented arrows the activity suppressed by the node; signals SF2, SFb are shown also at the end of the previous frame for drawing clarity.

That being stated, as long as a node does not have the right of access, it receives and retransmits all the activity in transit, receives and retransmits the activity directed to it and surveys the whole activity to recognize the instants at which it has the right of access. Thus, considering FIGS. 2 and 3, after signal SF, nodes Ni, Nn will detect without pauses, circuit activities C1 . . . C(i−1) and C1 . . . C(n−1), respectively.

When the instant of access arrives, the node inserts its own activity (and the frame signals in the case of master node Nn) and waits for the return thereof to suppress it. At the receiver, this results in an inactivity period Tp between C(i−1) and Ci and respectively between C(n−1) and Cn.

As to node Ni, the activity Ci is followed without any interruption by the circuit activity of the subsequent nodes (up to Cn), by signal SRI and by packet activity . . . P(i−1) of the preceding nodes.

Then, there is again pause in correspondence with the access of node Ni for packet activity and then every packet from P(i+1) to Pj*. Pj* is immediately followed by a start-of-frame signal SF2 of the second frame.

In the second frame, circuit activity is carried out as in the first frame. For the packet activity, after signal CR, node Ni detects activity Pj** after an inactivity period Tp, and then activities P(j+1) . . . Pn, signal SR2, etc.

The second inactivity period depends on the asynchronous mechanism of generation of signal CR, as can be seen from the succession of events described hereinafter.

After the emission of CR by the master node, no node has right of access before node Nj, which inserts its packets Pj immediately after signal CR. These packets are then followed by those of the subsequent nodes: signal CR continues the propagation along the ring together with packets Pj, P(j+1) . . . Pn and is suppressed by the master node, while the packets go on propagating until the round is completed. Between the recognition of CR and the arrival of Pj** at node Ni, a time period equal to Tp elapses, during which there is no activity on the line as seen at node Ni.

What has been stated for Ni also applies to node Nj involved in the interruption.

Node Nn, however, after Cn and SRI detects packet activity of nodes N1 . . . Nj up to Pj*; that activity is followed by a pause Tp due to the anticipated interruption of the packet activity of node Nj with respect to the end of frame. After this inactivity period, node Nn first detects signal SF2 (since Pj* is suppressed at the passage through node Nj) followed by the circuit activity of the second frame.

After CR, node Nn detects Pj** without interruption, since node Nj, having still the right of access, has caused its information to queue after CR. Then the operations go on as in the circuit region, with pause Tp between P(n−1) and Pn.

In case the interruption of packet activity takes place just during the access of node Nn, as shown in FIG. 4, activity Pn* and signal SF2 are inserted by the same node and hence Pn*, SF2 and the entire circuit activity C1 . . . C(n−1) appear without interruption at the receiver, after pause Tp subsequent to P(n−1). After C(n−1), there is an inactivity period Tp followed by the circuit activity Cn of node Nn, by CR, by Pn**, by SR2 and then by the packet activity of the new round.

Similarly, in nodes Ni, after circuit activity Cn of the second frame, CR, Pn**, SR2, P1 etc. (FIG. 5) are detected, thanks to the choice of node Nn as master node, the pause in correspondence with the interruption or resumption of the packet activity is eliminated when the interruption concerns the master node. The drawing does not show the case in which there are no interruptions in the packet activity, which occurs when it is necessary to emit SF after node Nn has emitted the end-of-activity flag. An event of this kind is, at least, unlikely to occur and, anyway, the situation at the receiver of the various nodes is similar to that of FIGS. 4 and 5 apart from the fact that instead of Pn*, there is the whole packet activity Pn of the node and that activity Cn of the second frame is immediately followed by SR2, P1, etc.

In summary, at any node there is always an inactivity time period Tp for each circuit or packet access, i.e. a time Tp for each round. In the case in which a packet round is interrupted during the access of a node different from the master node, there is a further time of inactivity Tp depending on the interruption of the packet round. A reconfigurable bus network of the same size, which uses the protocol described in the above-mentioned Patent application, presents an inactivity time Tp at the beginning and at the interruption or resumption of each packet round (and hence, as an average, an inactivity of 2 Tp per frame). Taking into account that by suitable management strategies of packet transmission by the devices of higher hierarchical level, the packet region can be made to correspond on the average to a packet round (generally resulting from two fragments of two successive rounds), the ring network on the average, presents at each frame one more inactivity time Tp with respect to the bus network.

Considering a propagation speed of the order of 5 s/km, a packet-processing time at each node corresponding, e.g. to a three-byte time (which, at a transmission speed of 140 Mbit/s, corresponds to 150 ns) for a network of some ten kms and with fifty nodes, the time period Tp is about 60 s. In a frame lasting 5–10 ms (representing a fairly good compromise between efficiency, which would require long frames to reduce the influence of frame signals and pauses, and the necessity of avoiding overlapping, which is easier to obtain with short frames), the ring network presents an efficiency reduction with respect to the bus, owing to the additional inactivity time, of about 0.1%, which can be tolerated without problems in applications in which the economic aspect is fundamental.

If a node is cutoff by its optical bypass as a consequence of a failure, the following node will recognize this fact, because the last signal EA considered is not followed by another command (more particularly SC, SCV0).

In the case in which the nodes do not transmit the information together with the coding of their serial number, the node following the insulated one will insert the activity after a time Ta allowing downstream nodes to recognize the lack of a node.

Inactivity time Ta can have a duration of some bytes, e.g. 4, so that there is no severe efficiency reduction even if many nodes are cut off.

On the other hand, a long sequence of inactive nodes cannot create confusion with pauses Tp, since time Ta either appears at instants at which a pause Tp cannot occur, (e.g. Ta occurs between the activities of the two nodes, which either precede or follow the node of interest or is present together with Tp (for the node or the nodes immediately preceding the node with the right of access); in both cases it is easy to recognize.

As to circuit activity organization in a node, different factors should be taken into account. First, generally a plurality of terminals are connected to a node, and hence each activity period C comprises information concerning a plurality of communications (i.e. a plurality of channels), which are not necessarily all active in each frame. Besides, a number of communications (more particularly, speech communications) can be dynamically managed, e.g. to apply procedures like DSI (Digital Speech Interpolation), so that a band is assigned to a communication only when the communication is active; other communications, by contrast, (e.g. data communications, denoting by this term those relevant to non-speech services, i.e. graphics services, video conferencing, etc.) require permanent band allotment to the respective communication. It is hence necessary not only to identify the various channels in the same activity period, but also to make a distinction between active and nonactive channels and between channels with dynamic or rigid management.

For the identification of individual channels, each of them can be assigned a pair of numbers, one indicating the number of the node and the other the channel position inside the activity period.

These numbers will be communicated by the calling node to the called node upon establishment of the connection and are maintained for the entire duration of the communication; this allows in a very simple way, a distributed management of channel identification in the receiving phase.

As to dynamically-controlled channels, to ensure a service quality convenient to both speech and data circuit-switched communications, for speech communications a blocking strategy is adopted which, according to the invention, concentrates the losses on the nodes with a higher serial number. This inhomogeneity simplifies the access. In fact, in each frame it is sufficient for each node to count the speech channels already existing and only if their number has not reached a predetermined maximum number, a new speech channel can be transmitted. The counting is simplified by the fact that the beginning of the information concerning the two types of communication is indicated by different signals.

In an example of this organization described in connection with FIG. 6, relevant to the activity period of node Ni, this node is supposed to handle seven channels denoted by Ci1 . . . Ci7. For the sake of clarity, signals SC, SCV have been associated with the corresponding channel number.

Among these channels, Ci1, Ci2 and Ci5 are assigned to data communications in progress, and are preceded by signals SC1, SC2 and SC5; channel Ci6 is an unused data channel (since the corresponding terminal has no communication in progress) and hence only signal SC6 will be transmitted.

The other three channels are speech channels and are associated with signals SCV3, SCV4, SCV7. Channel Ci4 is supposed for the purpose of illustration, to be temporarily inactive, e.g. because the source is in pause condition, and hence only signal SCV4 will be present.

Packet activity is also organized by transmitting a signal SC before the packets of each communication; the difference with respect to the circuit activity is that the lack of a channel activity need not be signalled, since the packets always contain the destination address.

Figure 7:
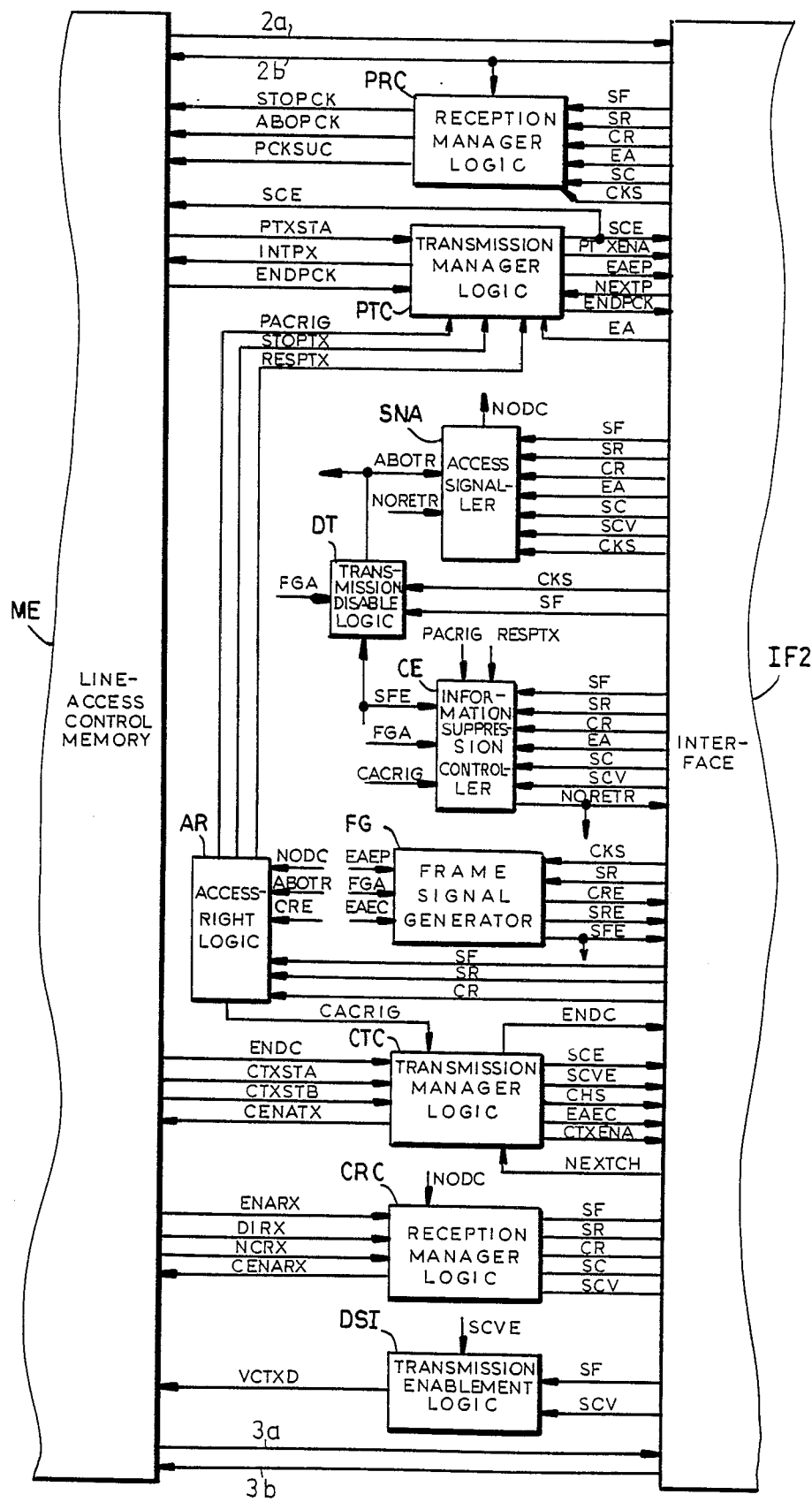
FIG. 7 is a more detailed block diagram of the logic network managing the access protocol in a unit.

In FIG. 7, the wires conveying packet and circuit information from line-access control ME to interface IF2 (and hence to interface IF1 and signal processor MAU, FIG. 1) and vice versa are represented at 2a, 2b, 3a and 3b.

Access protocol block APH comprises two sets of different devices for controlling the access during the two frame regions, and a number of devices operating independently of the region.

The latter devices are: a frame signal generator FG, sending-signal processor MAU (in case of the master node), commands SFE, SRE, CRE of emission of signals SF, SR, CR; a controller CE of information suppression; sending signal processor MAU, a signal NO-RETR disabling the retransmission of the information to be suppressed; a circuit SNA signalling the occurred access of a node (signal NODC); and a logic network AR recognizing the right of access of the nodes in both frame regions.

The portion of access protocol block APH dealing with packets comprises transmission-managing devices, consisting of a pair of logic networks PTC, DT, and devices PRC for managing the reception.

Logic network PTC exchanges with signal processor MAU and line-access control ME, the signals necessary to manage packet transfer from line-access control ME to the line with the already described modalities. Logic network DT has the task of disabling packet transmission in advance by the time Tp with respect to the end of the frame.

The reception part PRC serves to recognize packets to be forwarded to the station it belongs to on the basis of the address coded in the packet header and to exchange with signal processor MAU and line-access control ME, the signals necessary for the forwarding to and the temporary storage in line-access control memory ME of the correctly-received packets (i.e. packets not subjected to collisions). Hence, for its operations reception-manager logic PRC is connected to wire 2b and it receives the frame signals from signal processor MAU.

Also the part of access protocol circuit APH handling circuit-switched communications is split into two sets of devices intended to control transmission and reception. The transmission-controlling means comprise logic network CTC managing the transmission and a further logic network DSI which, in case of the presence of circuit-switched speech communications to be dynamically processed, enables or does not enable the transmission of the relevant information, according to band availability on the line.

The transmission-enablement logic DSI comprises a counter which is reset at each frame by SF, counts signals SCV or SCVE (command of emission of signal SCV) and generates as a carry-out signal, a signal VCTXD disabling the line access control storage or memory ME. Depending on the value preset in the counter, VCTXD may indicate either the last channel that can be transmitted, or a channel which can no longer be transmitted. In the latter case, the read commands for memory ME must be delayed so as to allow generation of VCTXD; in the former case, it will be sufficient to store VCTXD in a register keeping it available from its generation until the beginning of the subsequent frame.

The receiving part (circuit CRC) is to control the transfer from wire 3b to memoru ME of information flows relating to circuit-switched communications to be forwarded to the node they belong to, on the basis of the signals supplied by memory ME and of the frame signals.

The meaning of the various signals shown in FIG. 7 will be understood from the description of FIGS. 8 to 16 where possible circuit embodiments of blocks FG, CE, SNA, AR, PTC, PRC, CTC and CRC are shown, with the hypotheses that the master node is node Nn, that frame-signal generator is present in all nodes, and that the serial number of the transmitting node is not explicitly transmitted, so that node Nn is to carry out informatio suppression.

In all these FIGURES and in FIG. 7, the clock signals are denoted as CKS, and are those supplied by MAU and already resynchronized (apart from that of the master node to which the clocks of all other nodes are locked and which hence will be just the signal generated by local node oscillator), so that all the nodes might detect within a frame time the same number of pulses of the clock signal.

The master node is the only one in which a signal FGA is active (e.g. at logic level 1) although this signal is sent also to units MAU to indicate whether they need or need not effect the resynchronization.

Figure 8:
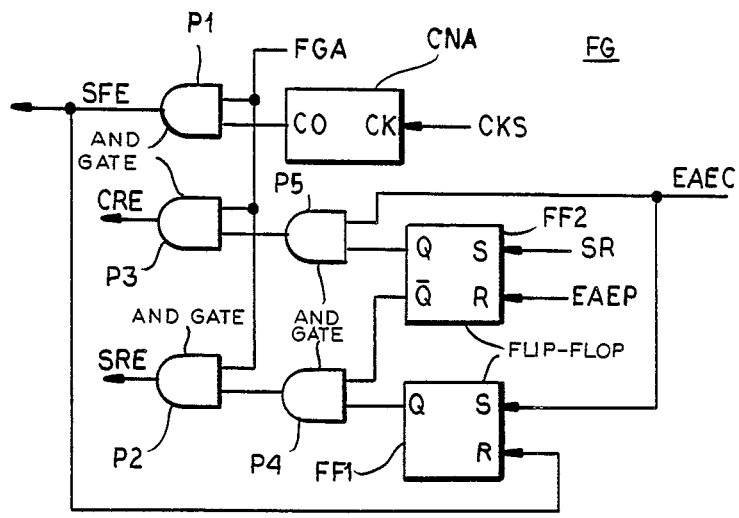
FIGS. 8 and 16 are circuit diagrams of some blocks in FIG. 7.

In FIG. 8 frame signal generating circuit FG comprises three elements generating commands SFE, SRE and CRE. Such commands are present at the outputs of three 2-input AND gates P1, P2, P3 enabled by signal FGA.

Taking into account that frame duration is constant, SFE is generated by a simple counter CN1, which counts the pulses of CKS up to the number corresponding to duration Z of a frame.

For SRE and CRE generation there are two set-reset flip-flops FF1, FF2.

The first is set by a signal EAEC generated by the logic network AR for access right recognition to cause the emission by MAU of signal EA relevant to the circuit-activity of node Nn (which signal coincides with circuit region end), and is reset by the Start-of-Frame flag; the output Q of FF1 is connected to an input of an AND gate P4, whose second input is connected to output Q of FF2.

FF2 in turn is set by signal SR and reset by signal EAEP (command of emission of signal EA relevant to node packet activity, coincident with the end of the packet round) and has output Q connected to an input of an AND gate P5, receiving at a second input signal EAEC. It is clear that the goal is attained by the arrangement described. In fact, in the packet region, a signal is present at the output of P4, and hence of P2, if the preceding packet round is completed (i.e. if FF2 has been set by EAEP); there is a signal at the outputs of P5 and P3 if a packet round has begun (i.e. if output Q of FF12 has been activated by SR) and has not been completed (signal EAEP not yet emitted).

In case of a single generator FG in the whole network, the three gates P1–P3 are obviously unnecessary.

Figure 9:
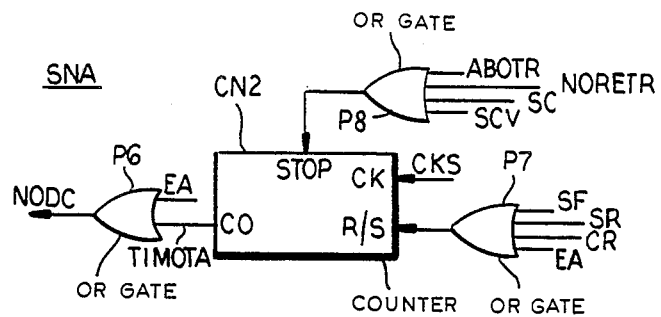

In FIG. 9 access-signalling circuit SNA generates signal NODC as the output signal of an OR gate P6 receiving at its inputs signal EA of end of activity of a node or signal TIMOTA indicating the expiration of time Ta permitting detection of an isolated node. Signal TIMOTA is generated as the carry-out of a counter CNA counting the pulses of CKS up to the value corresponding to Ta. CN2 is started and reset by signal SF or SR or CR or EA (gate P7) and is stopped by one of signals SC, SCV, ABOTR (emitted by DT, FIG. 7, to indicate the packet activity interruption), and NO-RETR (generated by CE, when the node has the access right).

These signals are supplied to CN2 through OR gate P8.

Count interruption by SC, SCV corresponds to the normal operating condition. The interruption by NO- RETR prevents the lack of activity for time Tp (FIG. 3) of the node having the right of access from being considered as lacking of one or more nodes. The same effect has the interruption by ABOTR for the nodes following the one which has emitted it. The interruption of the count during the pause following signal CR is not envisaged for the nodes preceding the one which has emitted ABOTR, since such nodes have no right of access during that period and hence signal NODC has no influence in that case.

Figure 10:
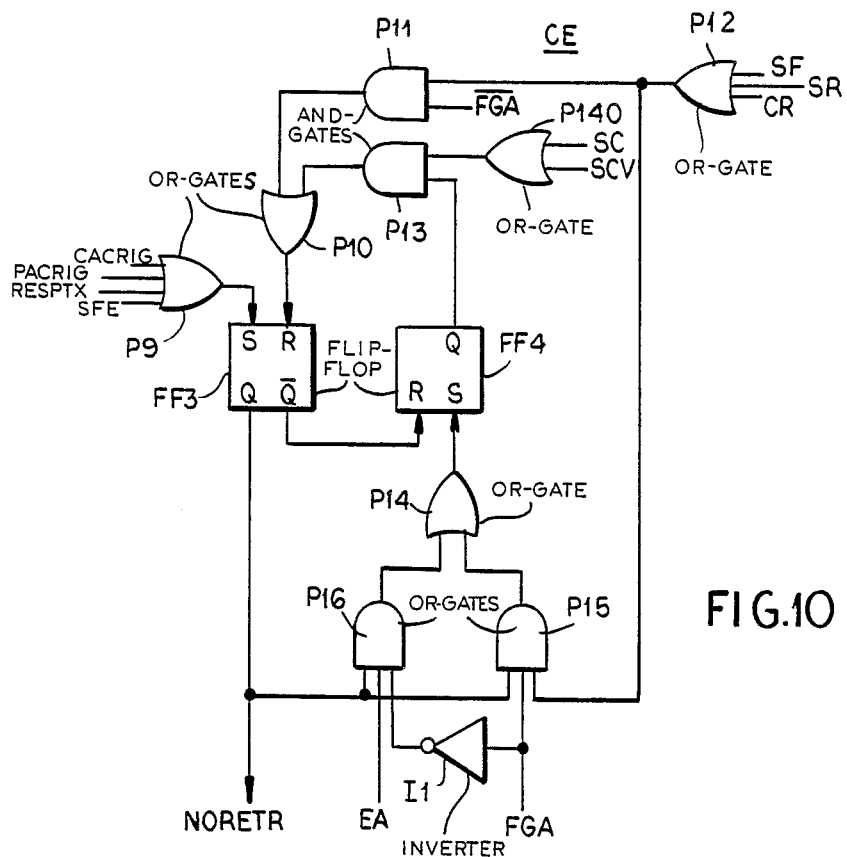

In FIG. 10, representing information suppressing circuit CE, signal NORETR disabling the node transmitter is present at the output Q of set-reset flip-flop FF3. FF3 is set, through an OR gate P9, by signals CACRIG, PACRIG (indicating the right of access for the circuit or packet region, respectively), RESPTX (indicating the packet activity has been resumed after the interruption) or SFE. The latter signal serves master node Nn to allow the elimination of its activity.

Signal NORETR is to be kept active up to the occurred suppression of the End-of-Activity flag EA (if the node is not Nn) or of such a signal and of the following frame signals (if the node is Nn). In addition, in the nodes different from Nn, the frame signals must be let through (i.e. retransmitted). Therefore, reset input of FF3 is connected to the output of 2-input OR gate P10. A first input of OR gate P10 is connected to the output of an AND gate P11, enabled only for nodes different from node Nn (signal FGA), which supplied FF3 with signals SF, SR, CR present at the output of an OR gate P12.

The second input of P10 is connected to the output of an AND gate P13 which has a first input connected to the output of another flip-flop FF4 has the reset input R connected to the output Q of FF3 and the set input connected to the output of a 2-input OR gate P14.

The inputs of gate P14 are connected to the outputs of two AND gates P15, P16, of which the first is active only for node Nn, and the other only for nodes different from Nn (via inverter I1).

The two gates are enabled by signal NORETR to let through frame signals (P15) or signal EA (P16).

This arrangement allows information suppression with the above modalities. In fact, for nodes different from Nn, signal NORETR is active from detection of signal EA until the arrival of signal SC, SCV of the following node; for node Nn signal NORETR is active until the detection of a frame signal, and is deactivated by the first signal SC, SCV relevant to the following node.

Figure 11:
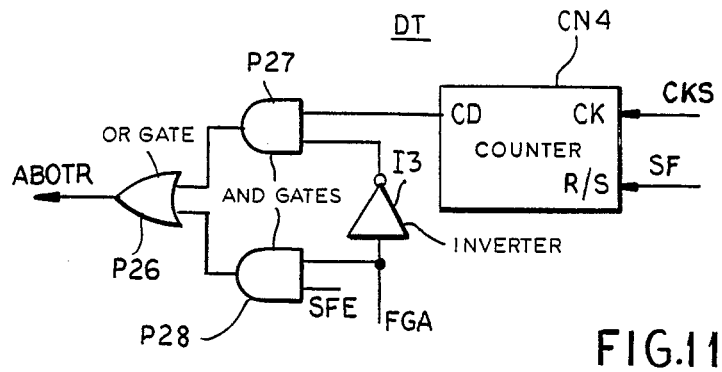

In FIG. 11, transmission-disable logic circuit DT disabling packet transmission generates the signal ABOTR when time Z-Tp has elapsed from the detection of the Start-of-Frame flag at the node receiver. DT consists hence of a counter CN4, reset and started by counting the pulses of CKS till the value corresponding to Z-Tp is reached.

In the master node, it is necessary to prevent the devices of signal processor MAU from receiving at the same time a request SFE for transmission of SF and the command of transmission of a packet owing to errors in the count of Z-Tp, e.g. due to the variation of duration of Tp because of node inactivation. To this end, the carry out of CN4 is used as signal ABOTR only for nodes different from node Nn, while node Nn used signal SFE as signal ABOTR. This result is obtained due to OR gate P26, whose inputs are connected to the outputs of two AND gates P27, P28 enabled respectively by FGA (inverter 13) or by FGA to let through the carry out of counter CN4 or signal SFE.

The acquisition of value Tp by the nodes can be managed in a centralized or distributed mode. In the first case, during the network service, network control outer NCC causes a packet to be sent on the line, measures the delay with which it receives the packet and communicates the time to all the nodes. In the second case, time Tp is determined during initialization phase by the network control center NCC as before, while during the normal operation the master node is entrusted with the control and diffusion. It is clear that the two approaches coincide if the master node is that associated with the network control center NCC.

Figure 12:
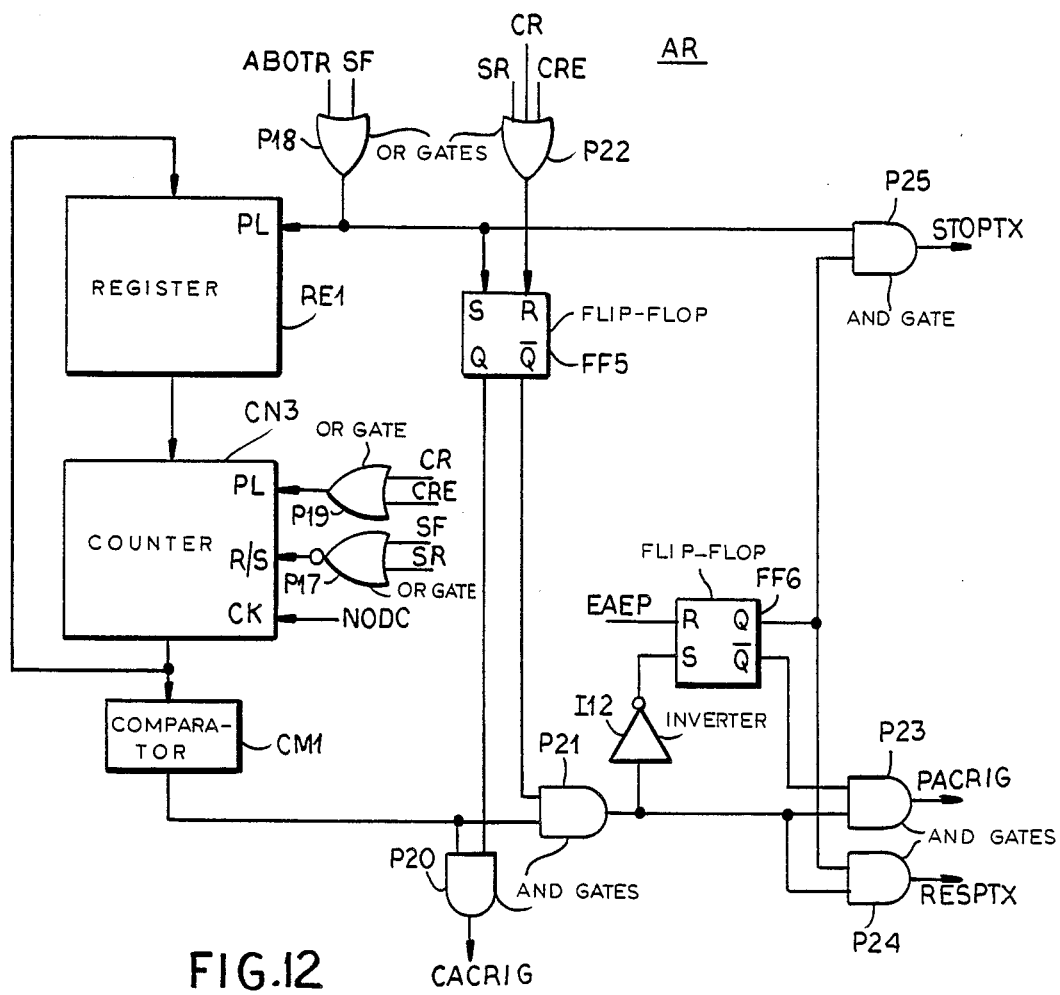

In FIG. 12, the access-right-recognition logic network AR generates a signal CACRIG (towards CTC) or PACRIG (towards PTC) when the access right is recognized in the circuit or packet region respectively, a signal RESPTX (alternative to PACRIG) when the node is to resume the packet transmission interrupted, and a signal STOPTX (always towards PCT) to interrupt packet transmission so as to avoid collisions with the Start-of-Frame flag.

To detect the access right a counter CN3 counts signals NODC emitted by access signaller SNA (FIG. 9), starting from Start-of-Frame SF or Start-of-Packet-Round SR. Signals SR, SF are supplied to counter CN3 somewhat delayed (e.g. in correspondence with their trailing edge as denoted by NOR gate P17) for reasons which will be examined hereinafter.

The current count of CN3 is supplied to a comparator CM1, which compares it with the serial number of the node and emits a pulse when the two values are equal.

The output of CN3 is connected also to the input of a parallel-in parallel-out register RE1 which, in correspondence with signals SF or ABOTR (OR gate P18) stores the count value reached by CN during the preceding packet round. The delay with which CN3 is reset is due to the necessity of allowing the transfer of such a count value to register RE1.

It is to be noted, that the arrival of SF after ABOTR does not change the situation in register RE1, because ABOTR stops the count of signals NODC in access signaller SNA (FIG. 9).

The value stored in register RE1 is loaded again into counter CN3 on the arrival of signals CR or CRE (OR gate P19), so that in case of interruption of a round, the access is ensured again to the node which had to interrupt the transmission.

Once comparator CM1 has recognized the access right by the node, its output signal is to be transformed into CACRIG, PACRIG or RESPTX, as the case may be. For this purpose, the output of comparator CM1 is connected to an input of two AND gates P20, P21, whose second input is connected to the outputs Q or Q, respectively, of a flip-flop FF5. Flip-flop FF5 receives at the set input signals ABOTR or SF and at the reset input, signals SR or CR or CRE, received through OR gate P22, so that its output Q is active in the circuit region and its output Q is active in the packet region of the frame. As a consequence, signal CACRIG is presented at the output of AND gate P20, while the output signal of AND gate P21 is further processed to distinguish whether it is a new access or a prosecution of the access interrupted.

For this, the output of gate P21 is connected to an input of two further AND gates P23, P24 and through an inverter I2 to the set input of a flip-flop FF6 receiving at the reset input signal EAEP.

Flip-flop FF6 is then set, with a delay introduced by conveyor I2, from the instant of the recognition of the right of access until the completion of node packet activity. The second input of AND gate P23 is connected to output Q of flip-flop FF6, and the second input of AND gate P24 to output Q of flip-flop FF6.

Hence, the gate P23 and gate P24 output signals are signals PACRIG, RESPTX: in fact, if output $\bar{Q}$ of flip-flop FF6 is active in correspondence with the right of access of the node, this node had completed the preceding packet activity and hence the access is a new one; if on the contrary output Q is active, the node had not completed the access and hence the activity previously interrupted is resumed.

Inverter I2 introduces the delay necessary to allow output Q of flip-flop FF6 to be still active at the instant of activation of the output of gate P21.

Output Q of flip-flop FF6 is also connected to an input of an AND gate P25 whose second input is connected to the output of gate P18. The output signal of P18 is signal STOPTX which is emitted if the signal SF or ABOTR arrive while the node has the right of access.

Figure 13:
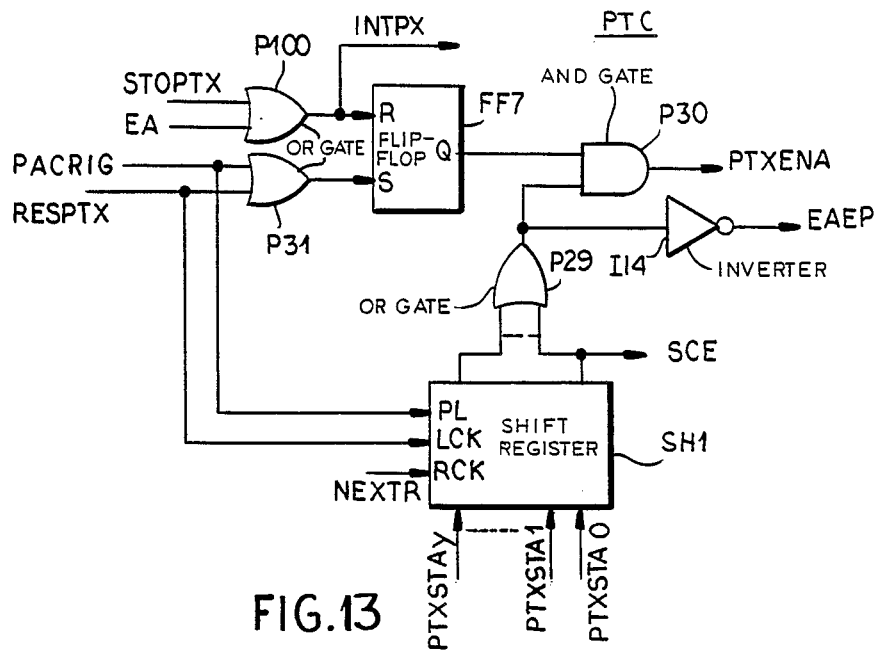

In FIG. 13 the circuit PTC controlling packet transmission comprises a shift register SH1 receiving a bit configuration PTXSTAO-PTXSTAy where the first bit is 0 and the other bits, in number equal to the maximum number of packets which can be transmitted, indicate, when at 1, packets to be actually forwarded on the line during a round. It is to be noted, that bits 1 are all consecutive since, as reported, there are no inactive channels within the packet activity of a node, and such bits at 1 are the most significant after PTXSTAO. Shift Register SH1 receives as parallel load command signal PACRIG and as command for bit shift towards the most significant positions a signal NEXTP by which signal processor MAU requests new packets.

The outputs of all cells of shift register SH1 are connected to an OR gate P29 whose output signal is 1 as long as there are packets to be transmitted (i.e. bits as 1 inside shift register SH1), while the passage to 0 indicates the end of packet activity of the node and causes emission of EAEP through an inverter I4.

Through an AND gate P30, the output signal of P29 is transferred to signal processor MAU as signal PTXENA enabling the forwarding of the packets on the line. Besides, the most significant bit of the configuration present at a given instant at the outputs of shift register SH1 forms a signal SCE by which the transmission management logic PTC requests from signal processor MAU the emission of SC and asks the line access control memory ME to forward a packet on wire 2a.

A second input of AND gate P30 is connected to the output of a set-reset flip-flop FF7 which is set by signals PACRIG or RESPTC, supplied by access-right logic AR (FIG. 10) through OR gate P31, and is reset by signal STOPTX, also supplied by access-right logic AR, or by signal EA (OR gate P100).

The output signal of P100 forms a signal INTXP forwarded to ME to block the packet forWarding over wire 2a. Signal RESPTX controls the backshift of the contents of shift register SH1.

By this arrangement, as soon as access-right logic network AR emits signal PACRIG for the node it belongs to, if that node has packets to transmit (at least bit PTXSTA1 at 1) PTXENA is emitted so that signal processor MAU may ask for the packets; besides, bit PTXSTAO is at 0, and signal SCE is still at 0. When signal processor MAU sends signal NEXTP, bit shift in shift register SH1 brings PTXSTA1 on the most significant output, so that SCE passes to 1 and causes the transmission of SC by signal processor MAU and the forwarding of the first packet to the signal processor MAU by the line access control memory ME. Assuming that the round is not interrupted, the operations go on in this way until the transmission of the last packet. Upon the arrival of the following signal, NEXTP, there are no longer bits at 1 in shift register SH1 and hence the outputs of gates P29 and P30 pass to 0 and EAEP passes to 1 thereby signalling the end of the transmission to signal processor MAU, which sends signal EA. From the Figure, it can be immediately deduced that the node without packets sends only signal EAEP.

In case of interruption of a round, the emission of STOPTX by access right logic AR (FIG. 10) causes the interruption of the packet forward by the line access control memory ME and causes PTXENA to become 0, notwithstanding that the output of gate P13 is still at 1. The transmission is resumed at the arrival of RESPTX: in this case, in order to avoid the loss of a packet whose transmission was not completed, RESPTX causes the backshift by a position of the contents of SH1 so that at the arrival of NEXTP the transmission can be resumed from the point of interruption. This obviously entails the presence in line access control memory ME of a counter of the transmitted packets, which is blocked by STOPTX.

FIG. 13 does not show signal ENDPCK (indicated in FIG. 7 at the input and at the output of transmission manager logic PTC), which signals the end of transmission of a packet and is sent to MAU to cause NEXTP emission.

Figure 14:
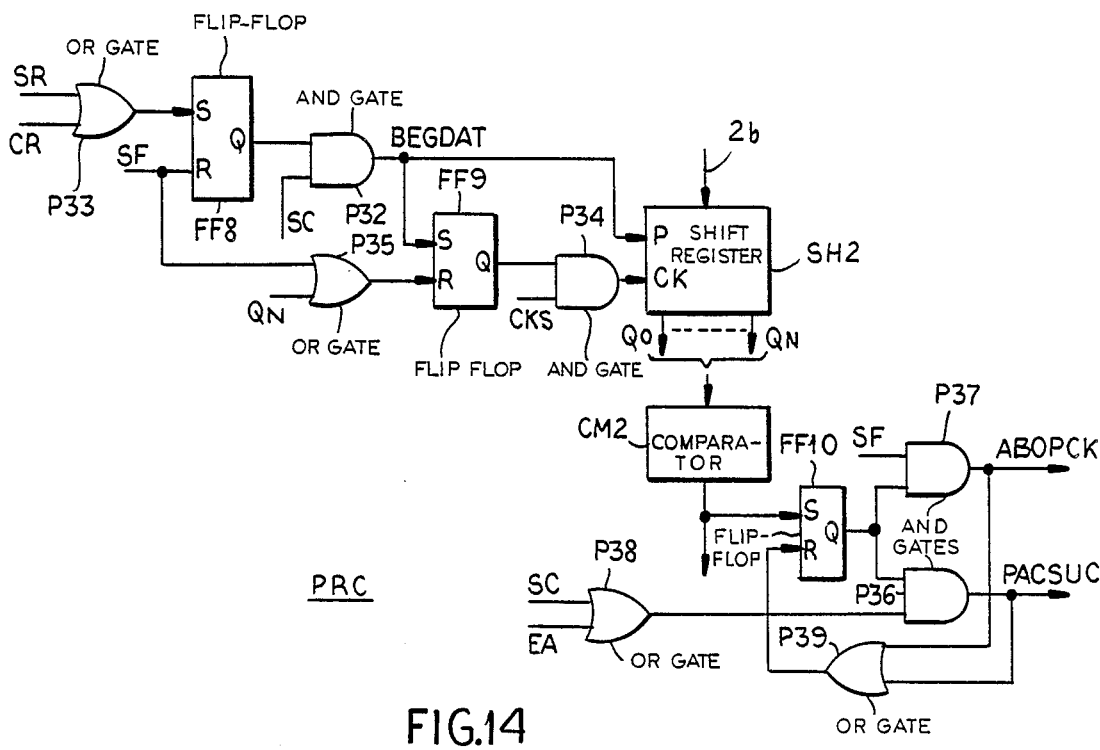

In FIG. 14, the logic network PRC controlling packet reception comprises a shift register SH2 which loads in series the bits coding the destination address of a packet (extracted from wire 2b) and, once the loading is completed, supplies them to a comparator CM2, where the address of the node is wired. Such bits are denoted by QO . . . QN, where QN is the last of the address bit.

The reset for shift register SH2 is supplied for each packet by a signal BEGDAT indicating the beginning of a packet. Such signal can be generated through an AND gate P32 receiving at an input signal SC (supplied by signal processor MAU to indicate the start of a packet) and has the other input connected to output Q of a set-reset flip-flop FF8 set by SR or CR (OR gate P33) and reset by SF. The shift command for shift register SH2 is given by clock signal CKS. CKS is supplied to shift register SH2 through AND gate P34 whose second input is connected to the output of a set-reset flip-flop FF9 which is set by BEGDAT and is reset through OR gate P35 by signal SF or by the completion of the load of the address in shift register SH2 (bit QN).

The output signal of comparator CM2 indicating address equality, forms a signal STOPCK enabling the storage of the packet in ME; the same signal STOPCK enables, through a set-reset flip-flop FF10, two AND gates P36, P37. Gate P36 receives through an OR gate P38 signals SC or EA, while P37 receives at the other input a signal SF. Signals PACSUC and ABOPCK are present at the outputs of such gates and are sent to the line access control memory ME to signal whether the packet has been correctly received or not; the same two signals through OR gate P39 and flip-flop FF10 disable gates P36 and P37. It is clear that the first occurrence of signal BEGDAT has no effect on gate P36 which is disabled since STOPCK has not yet been emitted.

Figure 15:
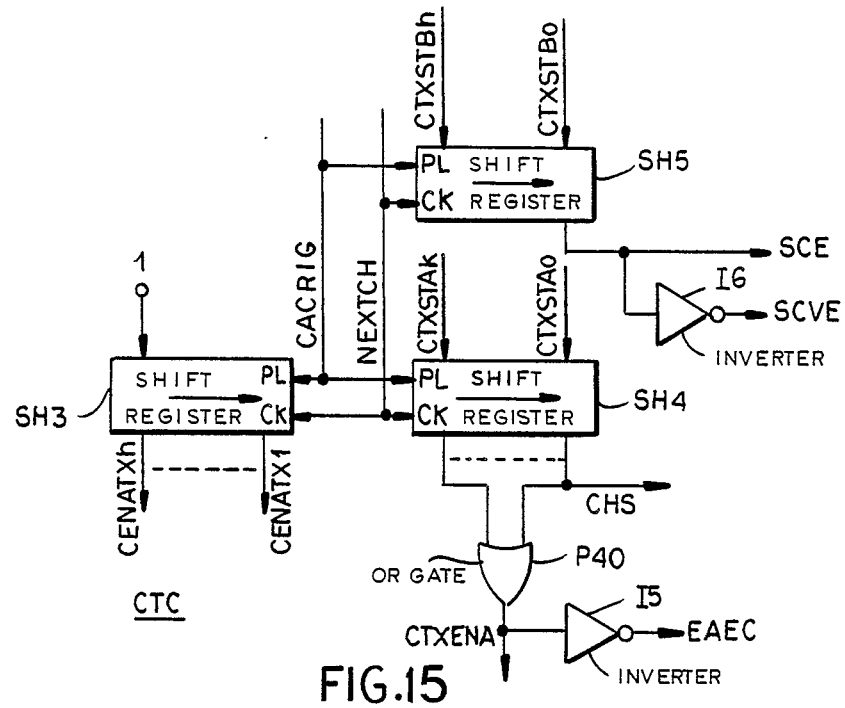

In FIG. 15, logic network CTC controlling circuit-switched information transmission comprises three sections, the first intended to generate signals CENATX1 ... CENATXh (h=maximum number of channels assigned to the node) for enabling in ME the controllers of transmission memories for such information, the second to enable the transmission by signal processor MAU of the information transferred by line access memory ME on wire 3a and to signal the end of activity of the node, and the third to control in signal processor MAU the transmission of signals SC, SCV according to whether the communication is rigidly or dynamically managed.

The first section consists of a shift register SH3 with h positions, enabled by CACRIG and implemented so as to sequentially present on its outputs a logic 1, starting from the instant of arrival of a shift command NEXTCH (from position h towards position 1) sent by signal processor MAU to request the sending of the information relevant to a channel by the corresponding memory in the logic access control storage ME.

The second section consists also of a shift register SH4 analogous to shift register SH1 (FIG. 13) and controlled by signals CACRIG and NEXTCH in the same way as shift register SH1 is controlled by PACRIG and NEXTP. The outputs of shift register Sh4 are connected to an OR gate P40, analogous to gate P29 (FIG. 13) whose output signal forms signal CTXENA, and, inverted in inverter I5, signal EAEC.

Such signals have the same meaning and the same effects as PTXENA and EAEP of FIG. 13.

Besides, the signal present at each instant on the output of shift register SH4 corresponding to the most significant bit, (CTXSTAO) is sent to signal processor MAU as signal CHS, indicating the state of activity of the channel to be transmitted. In case of inactivity, logic value 0 of CHS prevents the establishment of the connection between MAU and the memory for the data transfer. Of course, since circuit activity is not interrupted, there is no possibility of a back-shift as in shift register SH3; besides, any bit CTXSTA can be 1 or 0, since circuits temporarily inactive can be present among active circuits.

The third section comprises a shift register SH5 identical to shift register SH4, the cells of Which store a bit configuration CTXSTBO ... CTXSTBh where the first bit is always 0, as CTXSTAO, and the others are each associated with one of the channels and, indicate by their logic value whether the corresponding channel has a rigid or a dynamic management. E.g. logic value 0 indicates dynamic management and 1 rigid management. Signals CACRIG, NEXTCH are load and shift commands also for SH5. The signal present on the wire outgoing from the cell corresponding to the most significant bit (CTXSTBO) is signal SCE; the same signal, inverted in inverter I6, corresponds to SCVE. It is to be noted that signal processor MAU does not take into account signals SCE, SCVE before sending NEXTCH.

Logic network CTC is also to signal to the signal processor MAU the end of a circuit (signal CENDTX indicated in FIG. 7): this signal can be obtained as logic OR of signals, having the same meaning, emitted by memory controllers for the individual channels and used by signal processor MAU to generate signal NEXTCH.

Figure 16:
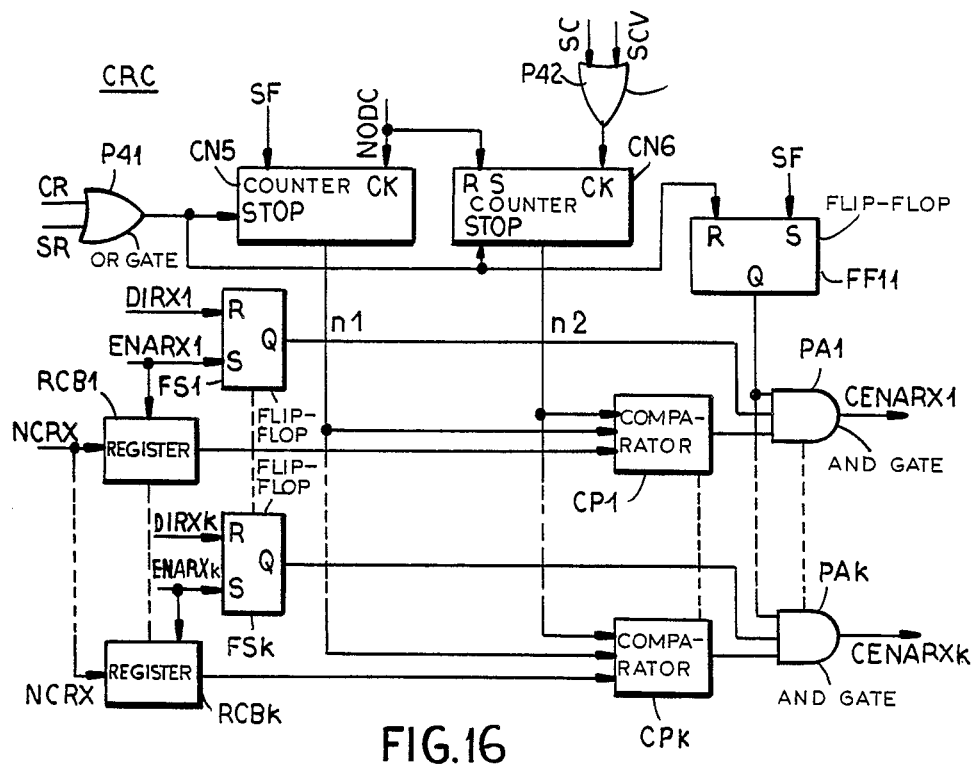

With reference to FIG. 16, logic network CRC controlling circuit reception, can enable storage in memory ME of the information present on wire 3b and relevant to different communications. Under the hypothesis that memory ME may simultaneously handle k communications (and hence comprises k memories for circuit information received), CRC will comprise k elements which are enabled and disabled by signals ENARX1 ... ENARXk, DIRX1 ... DIRXk supplied by the control logic of the circuit ME and which emit an enabling signal CENARX1 ... CENARXk for the controller of the respective memory.

Each one of these elements comprises a register $RCB_i$ (i=1 ... k) which, upon command of the respective signal $ENARX_i$, stores a bit configuration NCRX, supplied by the logic control storage ME and representing the pair of numbers n1, n2 identifying the individual communications. This bit configuration is supplied by register $RCB_i$ to a respective comparator $Cp_i$, which compares it with the values supplied by two counters Cn5, CN6 and emits an output signal when the two pairs of numbers are equal.

The first of these counters is to supply number n1 of the node active in a given instant in the circuit region, and hence it is started by signal SF, stopped by signals SR or CR (received through OR gate P41), and counts signals NODC arriving from access signaller SNA (FIG. 7).

The second is to count the number n2 of the channels inside the activity period, and hence it is set by signal NODC, stopped by signal CR or SR and counts signals SC or SCV received from an OR gate P42.

The output signal of comparator $Cp_i$ can be emitted during the circuit region as signal $CENARX_i$, through AND gate $PA_i$, as long as the corresponding channel is enabled; consequently, gate $PA_i$ will receive as enabling signals the signal present at output Q of a set-reset flip-flop FF11, set by SF and reset by Sr or CR, and the signal present at the output of a set-reset flip-flop $FS_i$, set by $ENARX_i$ and reset by signal $DIRX_i$ indicating channel disabling.

As reported, by keeping fixed (apart from failures) the master node, there is in general a pause Tp in correspondence with round interruption. This pause can be eliminated by assigning the task of master node to a node which can be different at each frame.

More particularly, the node having the right of access (not yet completed) and which has not yet detected the beginning of the new frame, but which detects or has already detected expiration of time Z-Tp, interrupts packet transmission, if any, as before, yet it immediately assumes the functions of master node by sending the start-of-frame flag and its circuit activity. In this way also the nodes located between the new master node and the node which had previously generated the frame signal, instead of having their activity inhibited for time Tp, can immediately start circuit information transmission, placing their activity in the new frame which is being formed. By changing the master node, node access order will vary at each frame; obviously the new master node will be also that which first accesses the line in the packet region. That access technique requires that only the start of frame is signalled. Beginning and continuation of packet rounds need no longer be distinguished, since the node whose packet transmission has been interrupted becomes the new master node and hence automatically is the first to have the access in the new packet region. The beginning of packet region also is not to be signalled, since the simple count of the number of nodes which have had the access allows the end of the circuit region to be determined.

The explicit presence of a region-boundary signal can facilitate the supervision of the network operation.

As a consequence of the possible transfer of the functions of the master node, there is a reduction (by a time shorter than or equal to Tp) in frame duration for all the nodes, starting from the new master node until the old one excluded. This merely implies a reduced quantity of information, relevant to circuit communications, written or read in memories of the line access control storage ME in a frame. Yet this causes no problems, taking into account that such memories are implemented so as to allow variable-band transmission.

The other effect on practical implementation is that the lack of rigid periodicity of the Start-of-Frame flag, which before was emitted always by the same station and formed per se a synchronizing element, can render the task of synchronism recovery more critical.

Figure 17:
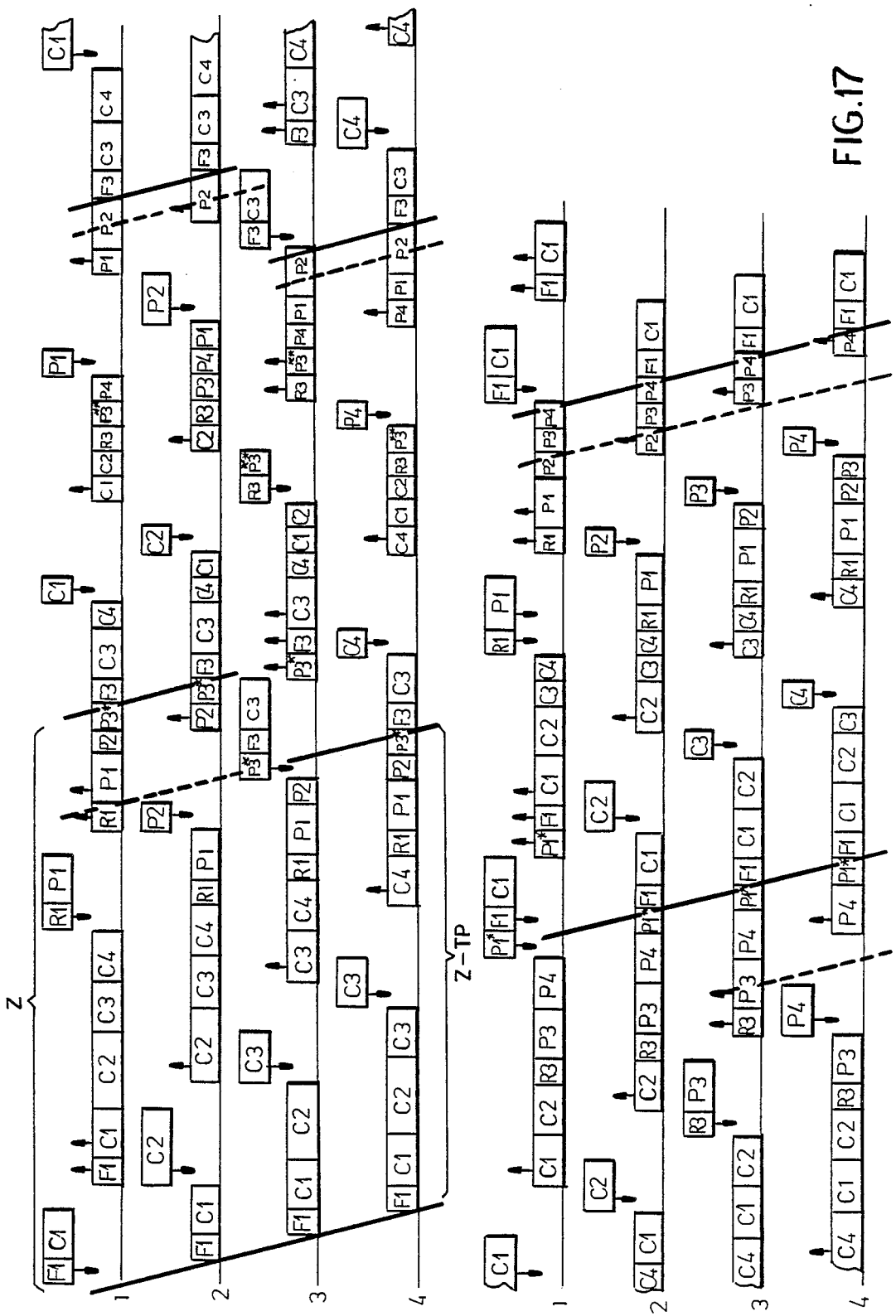
FIG. 17 is an example of organization of the information in another embodiment of the protocol.

FIG. 17 shows four consecutive frames, according to the variant disclosed, relevant to the node receivers of a network, which, for the sake of simplicity, is supposed to comprise four nodes.

The symbolism adopted for these FIGURES is the same as that adopted for FIGS. 2–5, and hence Ci, Pi, indicate circuit or packet activity of the i-th node; Fi, Ri indicate the Start-of-Frame and the Region-Boundary flags (which are supposed to be explicitly transmitted) inserted by the i-th node. Dashed slanting lines indicate for the various nodes the expiration of time Z-Tp and hence the possible necessity of transferring the master node function.

The master node in the first frame represented is node 1, and time Z-Tp expires while node 3 is active during a packet round.

Hence, node 3 transmits onlY a part P3* of its packets, followed bY Start-of-Frame flag F3. As seen, for nodes 3 and 4 the first frame lasts then only Z-Tp, while for nodes 1 and 2 the duration is Z. It is to be noted that there is no danger of duplicating the Start-of-Frame flag, since node 1 knows that is needs not introduce such a signal, since the interruption has not occurred in correspondence with its turn of access.

In the second frame, the main node is node 3 and the access will take place in the order 3-4-1-2; of course node 3 will have to transmit R3, followed by the rest of its packet activity P3** and so on, in the same order as for the circuits.

In this second frame, time Z-Tp expires for all nodes at an instant at which no node is transmitting, and node 3 is the first to have the right of access after the expiration of such a time period. Then in the third frame the master node is still node 3 and the operations are carried out as in the second frame; the only difference is that node 3 transmits all its packet activity and not only the residual activity. In this third frame, time period Z-Tp expires during transmission of P1, and hence the transfer to node 1 of the master node functions takes place as at the end of the first frame. Finally, the fourth frame expires again while no node is transmitting and hence there is a situation analogous to that occurring at the end of the second frame.

As seen in this variant, a node presents only one inactivity period in the packet rounds in correspondence with the access to the line, while there is no longer the inactivity period in correspondence with the interrupted rounds.

It is to be added that each node can detect the identity of the node acting as master on the basis of the frame activity, since the access right is recognized by a cyclic counting (as will be better seen hereinafter) and not by a counting reset at each frame. However, for better reliability and also to ease the activation of a new node or the reactivation of a node, e.g. after a failure, signal F can contain the indication of the node by which it has been emitted, indication which is periodically checked by all the nodes.

By use of the variant just described, the disable transmission block DT is no longer necessary in the access protocol circuit APH (FIG. 7). In fact, since the node which must interrupt packet transmission becomes the master node and is to emit the Start-of-Frame flag F, the command FE of emission of signal F can carry out the functions previously carried out by ABOTR.

For the rest the block diagram of the access protocol circuit APH is like that of FIG. 7, apart from some differences in the input/output signals which will result from the detailed description of the blocks interested by the protocol variant, which blocks are those operating independently from the frame region.

Blocks FG1, CE1, AR1 (corresponding to blocks FG, CE, AR of FIG. 7) are shown in detail, since their structure has varied. The block carrying out the same functions as access signaller SNA keeps the structure unchanged, yet it is started by signal R (in place of SR and CR) while ABOTR is missing among the stop signals.

Figure 18:
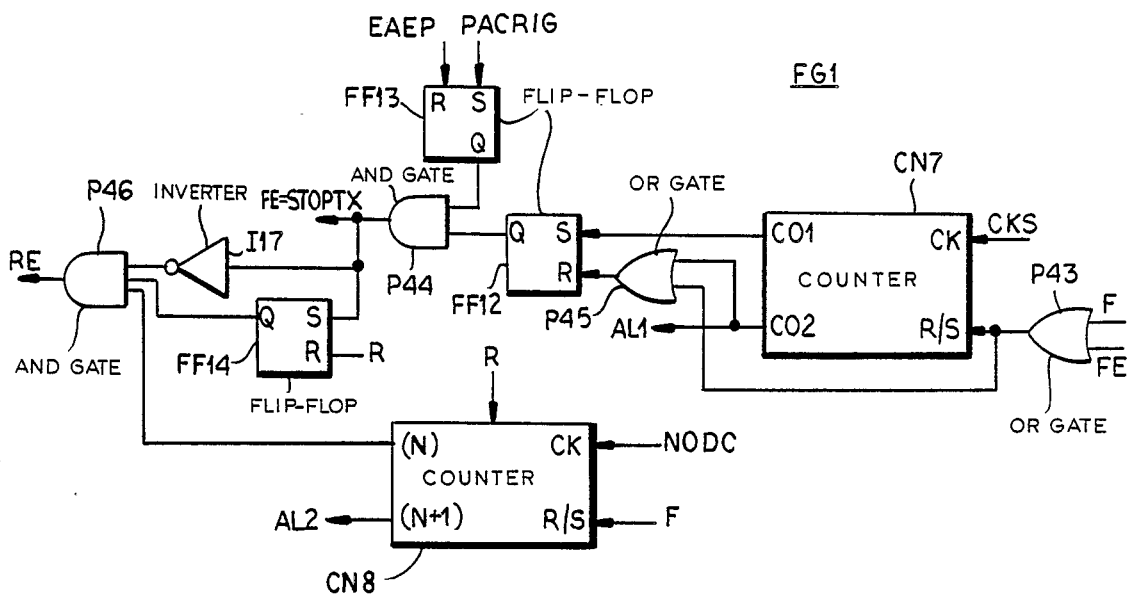
FIGS. 18 to 20 are circuit diagrams of some blocks of the network, in case of the protocol of FIG. 17.

In FIG. 18, frame-signal generator FG1 is to generate commands FE, RE of emission of signals F, R, the first of which also carries out the functions of signal STOPTX emitted by access signaller AR in the scheme of FIG. 7 to interrupt the packet round.

To this end, two counters CN7, CN8 are provided. The first one, started by signal F or FE (gate P43), counts the pulses of signal CKS up to a first value, corresponding to time Z-Tp, and the a second value, indicating that time Z has been exceeded. The two carry-out signals are presented on two outputs CO1, CO2. The signal present on CO1, stored into a flip-flop FF12, will become signal FE which is presented at the output of an AND gate P44 if time Z-Tp expires while the node has still the right of access in the packet region: this situation is signalled by a set-reset flip-flop FF13, set by PACRIG and reset by EAEP. The signal present on CO2 is an alarm signal AL1, exploited by higher node levels, and indicates that the normal frame duration Z has been exceeded. Alarm signal AL1 or the output signal of P43 act as reset signals for FF12 (OR gate P45).

The second counter CN8, started by F, counts signals NODC. This counter also has two carry-out outputs CO3, CO4, the first activated when the count of CN8 attains number n of the nodes and the second when the count exceeds such a number. Also the signal present on CO4 is an alarm (AL2) sent to higher level devices. The signal present on CO3 is emitted as signal RE through an AND gate P46 which, in absence of FE (inverter I7), is enabled by the output signal of a flip-flop FF14 which is set by FE and reset by R.

Figure 19:
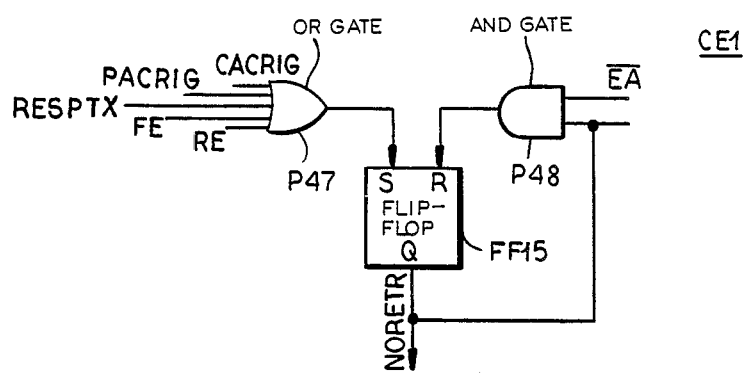

In FIG. 19, block CE1 generating signal NORETR, can be seen to be a simple set-reset flip-flop FF15 analogous to flip-flop FF3 (FIG. 10); flip-flop FF15 receives at the set input signals CACRIG, PACRIG, RESPTX, FE, RE (OR gate 47) and is reset by its output signal in correspondence with the trailing edge of EA (signal EA) through an AND gate P48. The delay allows also the extraction of signal EA.

Figure 20:
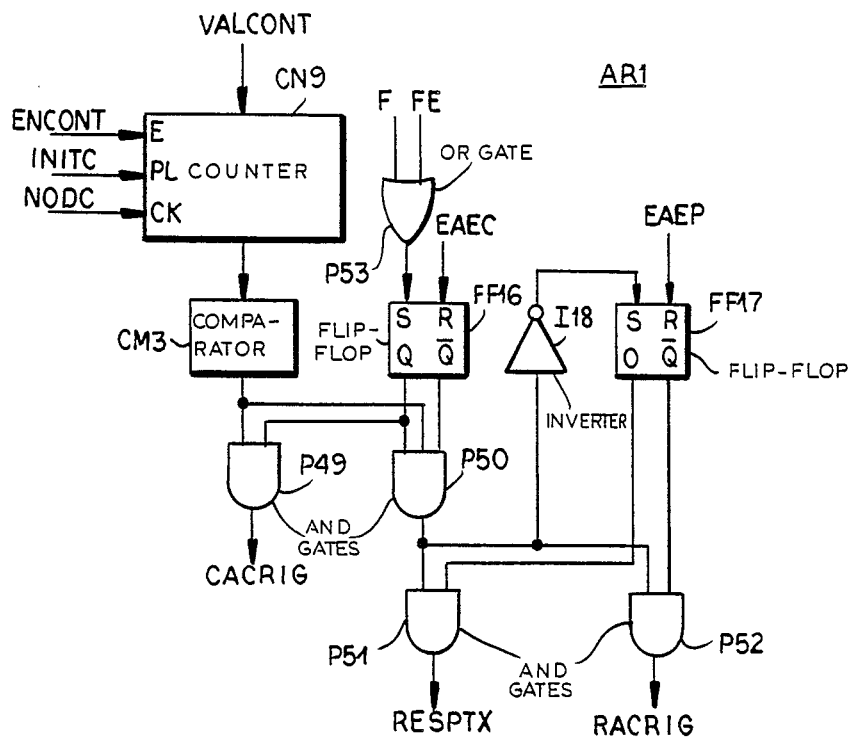

In FIG. 20, access-right circuit ARI for recognizing the right to access, still emits signals CACRIG, PACRIG, RESPTX; it is no longer necessary to emit signal STOPTX, whose functions are carried out by FE, as reported. Circuit AR1 is based on a modulo n (n=number of the nodes) counter CN9 which is enabled by a signal ENCONT (emitted by the higher levels of the node) and cyclically counts signals NODC. When a node becomes active (for the first time or after an interruption) it is to be informed of the identity of the master node, and for this purpose the first count after the beginning or the resumption of the activity begins from a value VALCONT (corresponding in practice to the serial number of the master node) loaded upon command of a signal INITC, this too emitted by higher node levels. The output of CN is connected to a comparator CM3, which functions identical to those of comparator CM1 (FIG. 12) whose output signal is in turn, converted into signals CACRIG, PACRIG, RESPTX with modalities similar to those described for access right circuit AR. To this end, there is provided AND gates P49-P52, inverter I8 and flip-flops FF16, FF17 having functions similar to those of gates P20, P21, p23, p24, inverter I2, and flip-flops FF5, FF6 of FIG. 12.

Owing to the different round organization, flip-flop FF16, which makes a distinction between circuit and packet region is set by signals F or FE (gate P53) and reset by signal EAEC.

In a variant for both protocol embodiments described, a token passing mechanism can be used for the recognition of the access right. The mechanism is basically the classic one, for which a node, before acceding, waits for token detection, takes it off to access, inserts its own activity and then reemits the token after the activity itself.

A node which cannot access or does not wish to access, simply does not extract the token. In this way, no inactivity periods are created and signal EA is not to be transmitted by the nodes which have no information to be transmitted.

It is then clear that a count of the nodes which have obtained the access, is made impossible and hence the explicit transmission of the identity of the transmitting node becomes necessary to make possible, during reception, the association between the communication and a node.

This indication will be transmitted as first information, preceded by a signal SC.

The same token can be used for both regions, or two tokens can be used, one for the circuit region and the other for the packet region.

In this approach Region-Boundary (RB) and Start or Continuation of Packet-Round flags would no longer be necessary. In fact, supposing that the tokens for two regions are different, the first node having the access in the circuit region transmits the token, which is taken away by the other nodes and placed after the activity. When the first node receives the token of the circuit region, this means that such region is ended and hence such node can transmit its packets. If the token is unique, its first reappearance indicates the end of the circuit region and the following reappearances, the end of respective packet rounds.

The Start-of-Frame Flag acts both as a synchronizing event, to facilitate the computation of interval Z-Tp (whose count ought otherwise to start from the instant of recognition of the first circuit activity following a packet activity), and above all it serves to avoid the inconvenience typical of token passing systems (token loss or duplication), which in this way would interest only the frame where they occur.

Figure 21:
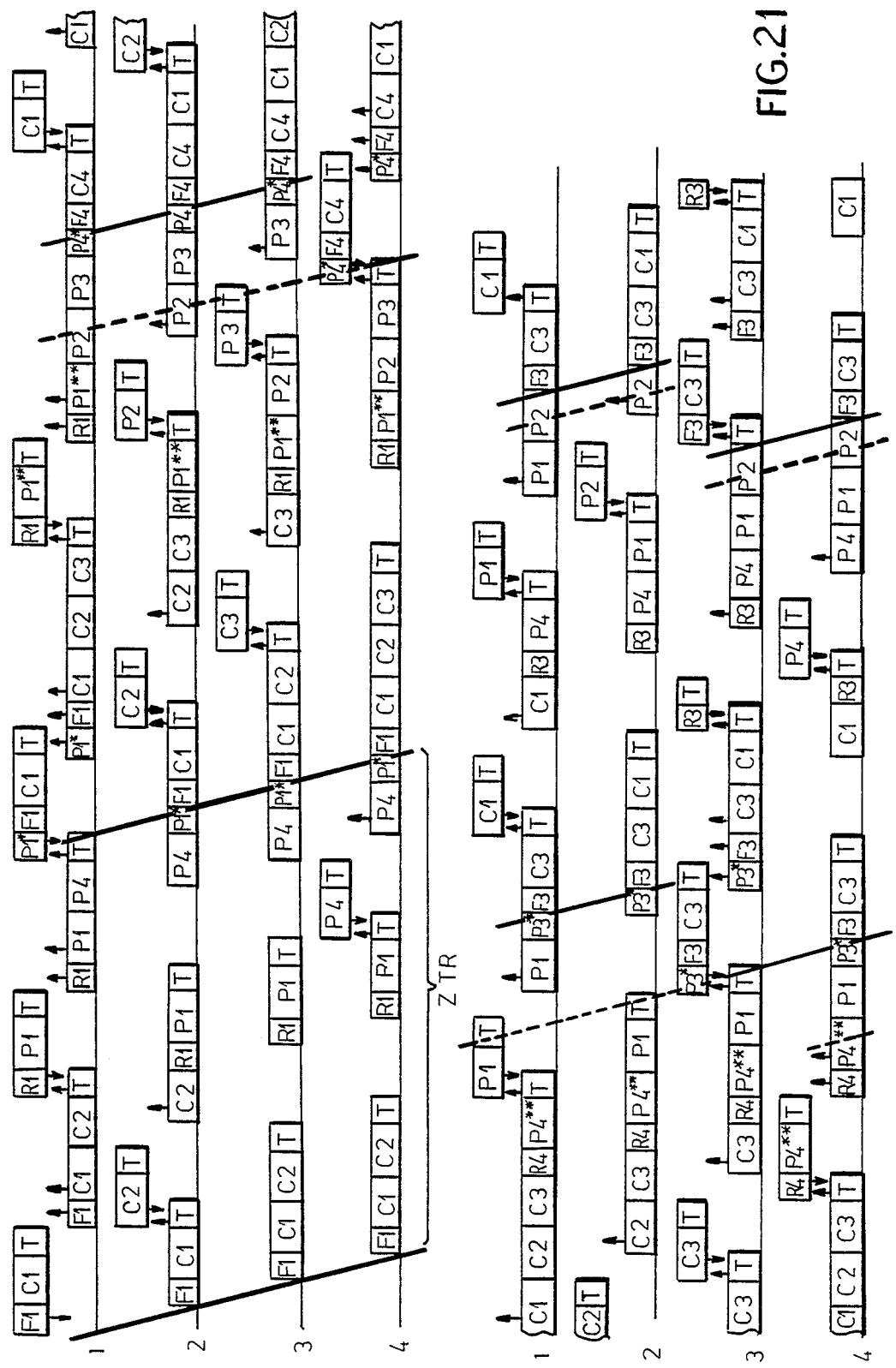
FIG. 21 is an example of information organization in a variant of the protocol.

FIG. 21, analogous to FIG. 17, shows frame organization in the variant applied to the approach described as to FIGS. 17–20. A single token for both regions is used and it is supposed that region boundary flag R is explicitly transmitted.

As shown in FIG. 21, the master node in the first frame is node 1, which inserts Start-of-Frame flag F1, its circuit activity C1 and token T. Nodes having circuit activity to transmit (only node 2 in the example depicted) take the token away, insert their activity and re-insert the token.

As before, each node takes away its activity at the end of the ring. When node 1 detects T removes it and inserts region boundary flag R1, its packets and token T; the following nodes with packets to transmit (only node 4 in the example) go ahead as in the circuit region, extracting T and inserting their activity followed again by T.

Time period Z-Tp expires while the node N1 has again the access. The node is supposed to have already taken away T and transmitted a part P1* of its packets The operations are then repeated as in the first frame. The second and third frame do not present any pecularity.

In correspondence with the fourth frame, the master node (node 3 in that frame) is to extract T, to insert signal R3 and re-insert T even if it has no packets to transmit, while the other nodes under similar conditions have nothing to do but to retransmit the received information. Obviously, a node without circuit activity which is to become master node will operate in similar way.

By the token passing mechanism, it is convenient to introduce a delay between the receiver and the transmitter of each node to allow token recognition and the decision of transmitting the activity. In the absence of this delay, variable inactivity time periods would be possible between the information inserted by two active nodes. FIG. 21 supposes that the delay has been introduced, that is why the operation of transmission is represented as contemporaneous with that of extraction of the token.

It can be noted that in known token-passing systems for integrated service networks, the information is transmitted as packets and there is neither distinction between the two regions nor round organization: a node can have the access only for transmission of packets relevant to the communications with continuity characteristics, if the time elapsed from the last node has detected the token exceeds a predetermined value.

FIGS. 22–27 show the circuits of the access protocol unit APH and of a number of its blocks for the application of the invention in a local area network in which the access is recognized by the use of a token. Blocks having the same functions as those of FIG. 7 are denoted by the same reference letters followed by digit 2.

Figure 22:
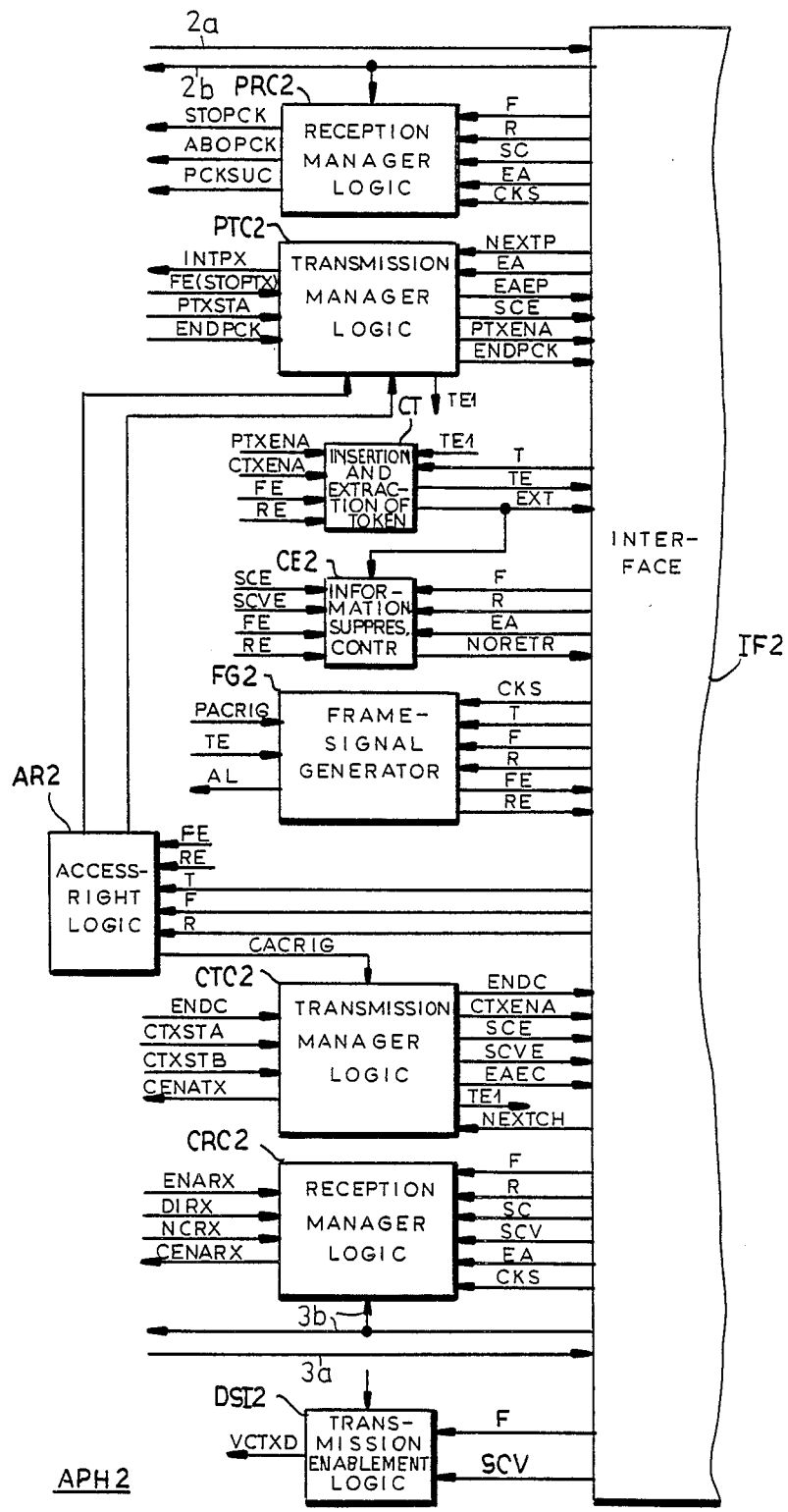
FIG. 22 is a block diagram similar to FIG. 7, for the protocol of FIG. 21.

As shown in FIG. 22, block SNA counting the nodes which have had the access is replaced by a block CT controlling insertion and extraction of the token by the devices of the signal processor MAU (FIG. 1). According to whether the network master node is fixed or variable, block DT will be present or not. FIG. 22 refers to this second case.

The meaning of the signals present only in this embodiment will result from the following detailed descriptions of blocks AR2, CT, CE2, PTC2, CRC2. The other blocks are not described because the have undergone little or no variations from the corresponding blocks originally described.

Signal processor MAU (FIG. 1) emits towards APH a signal T upon token recognition, holds the token during the time necessary to recognize the possible need to accede the line, and retransmits the token after such a time period if the node is not to transmit information.

If the node is to transmit information, MAU will receive from APH commands EXT, TE of extraction and transmission of the tcken.

Figure 23:
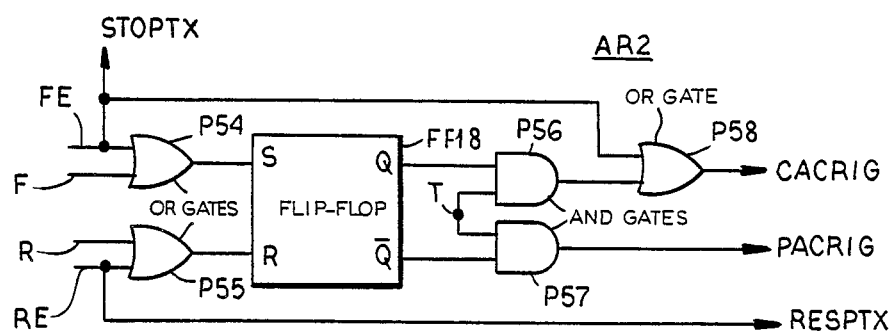
FIGS. 23 to 27 are circuit diagrams of some blocks of FIG. 22.

That being understood, FIG. 23 represents the access-right logic for access-right recognition. Access-right logic AR2, like the logic AR1, emits signals CACRIG, PACRIG, RESPTX, and basically consists of a flip-flop FF18 storing the information that circuit or the packet region of the frame is ongoing. For this purpose, flip-flop FF18 is set by F or FE (OR gate P54) and reset by R or RE (OR gate P55). Depending on which one of the two outputs of FF18 is active, CACRIG (AND gate P56, OR gate P58) or PACRIG (AND gate P57) is emitted upon arrival of signal T. It is to be noted that for the master node signal CACRIG is signal FE; hence the presence of OR gate P58, receiving FE and the output signal of gate P56.

Figure 24:
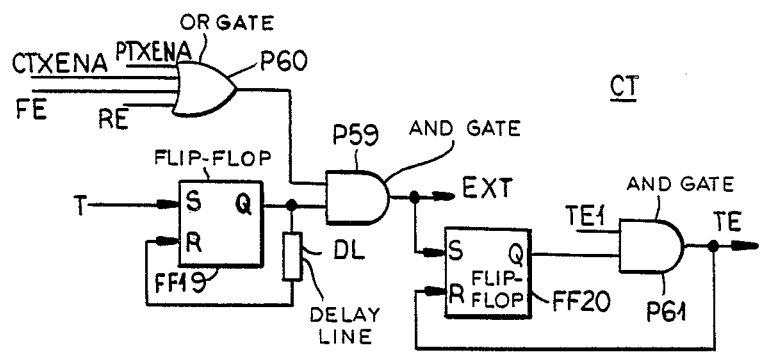

In FIG. 24, the token insertion/extraction circuit CT has the task of supplying signal generator MAU with commands EXT, TE of token extraction and retransmission.

The extraction of the token is controlled, after circuit CT has received signal T, if there is actually activity or in case of master node. Therefore, signal EXT is emitted as output signal of an AND gate P59 having an input connected to output Q of a flip-flop FF19 set by T, and the other input connected to the output of an OR gate P60 receiving signals PTXENA, CTXENA, FE, RE.

In case of inactivity, flip-flop FF19 is reset by its output signal through a delay element DL, e.g. a delay line.

For the emission of TE, signal EXT is supplied at the input of a second flip-flop FF20 whose output enables an AND gate P61 to let through, as command TE, a signal TE1 emitted either by block CTC2 or by block PTC2 with the modalities disclosed hereinafter.

For the sake of simplicity, in this Figure, as well as in FIG. 22, signal TE1 emitted by CTC2 has not been distinguished from that emitted by PTC2, since the functions are the same.

Figure 25:
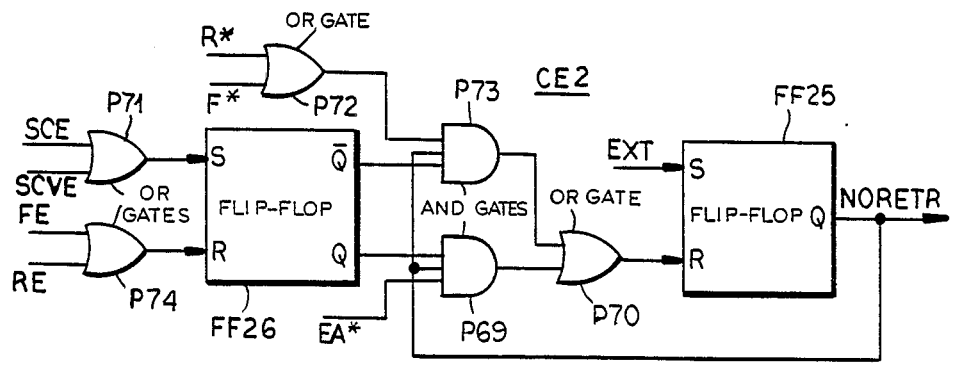

In FIG. 25, information suppressing circuit CE2 emits signal NORETR if the node has activity or frame signals to be transmitted. To this aim signal NORETR is the output signal of a flip-flop FF25 set by EXT.

Signal NORETR is reset with different modalities according to whether the node is a generic node or is the master node. In the latter case it is necessary to distinguish whether the node has transmitted only frame signals or also circuit and/or packet activity and to consider the modalities according to which a node becomes master.

In the first case, flip-flop FF25 is reset by signal EA* (which is signal EA delayed so as to allow its suppression by CE) through an AND gate P69 and an OR gate P70 connected to the reset input of flip-flop FF25; gate P69 is enabled by commands SCE or SCVE (OR gate P71) through a flip-flop FF26 set by such commands.

In the second case, if the master node transmits only the frame signals, NORETR is reset by signals F*, R* (i.e. from deayed signals F, R) through OR gate P72 and AND gate P73, connected to a second input of P70; AND gate P73 is enabled through output Q of flip-flop FF26 reset by signals FE, RE (OR gate P74).

If the master node also transmits activity, its predisposition to reset NORETR through output Q of flip-flop FF26 is annulled by the first command SCE subsequent to the frame signal, and the circuit prepares itself to allow the resetting of NORETR by EA.

This arrangement also takes into account the fact that, at the expiration of time Z-Tp, start-of-frame flag FE can be emitted before signal EA indicating the end of packet activity; in this case a double switching of flip-flop FF26 is possible (if after FE it is necessary to transmit circuit activity) or flip-flop FF26 can be simply reset to allow reset of NORETR by F*.

Figure 26:
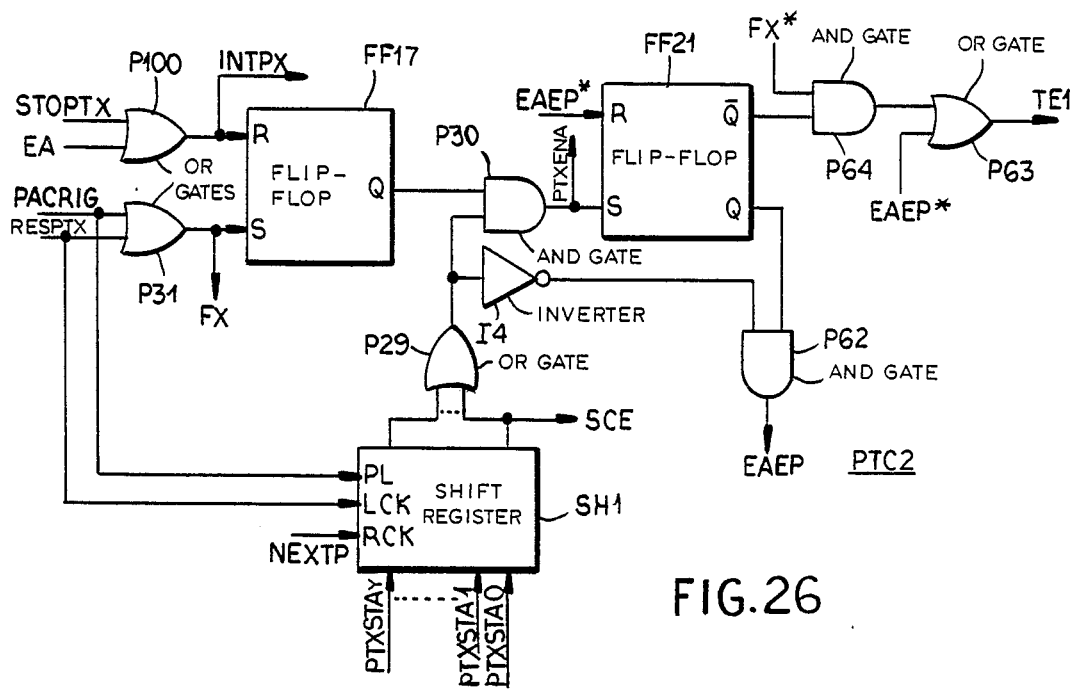

In FIG. 26, the circuit PTC 2 controlling transmission of packets comprises all the elements of the transmission manager logic PTC (FIG. 13), since it is to generate signals EAEP, PTXENA, like the transmission manager logic PTC.

Such elements are then indicated by the same reference characters as in the Figure described earlier.

Morecver, there have been added devices for generating signal TE1 presetting the token insertion/extraction circuit CT to emit TE, whenever the node has right of access in packet region, and devices for disabling the emission of EAEP in the absence of activity.

For such a disabling the output of inverter I4 is connected to an AND gate P62 which has a second input connected to output Q of a flip-flop FF21 which is normally reset and is set by signal PXTENA and reset by a signal EAEP* which is signal EAEP slightly delayed for stabilization purposes.

Signal TE1 is on the contrary the output signal of an OR gate P63 and is emitted after the emission of EAEP, if the node has packets to transmit, or, in the absence of activity, whenever the node has right of access. Therefore, gate P63 will receive as input signals signals EAEP* and the output signal of an AND gate P64 which has an input connected to output Q of flip-flop FF27 and receives at the other input a signal FX*, which is signal FX outgoing from gate P31 delayed so as to allow the possible emission of EAEP.

Modifications disclosed for PTC2 are repeated in CTC2, which hence is not shown.

Figure 27:
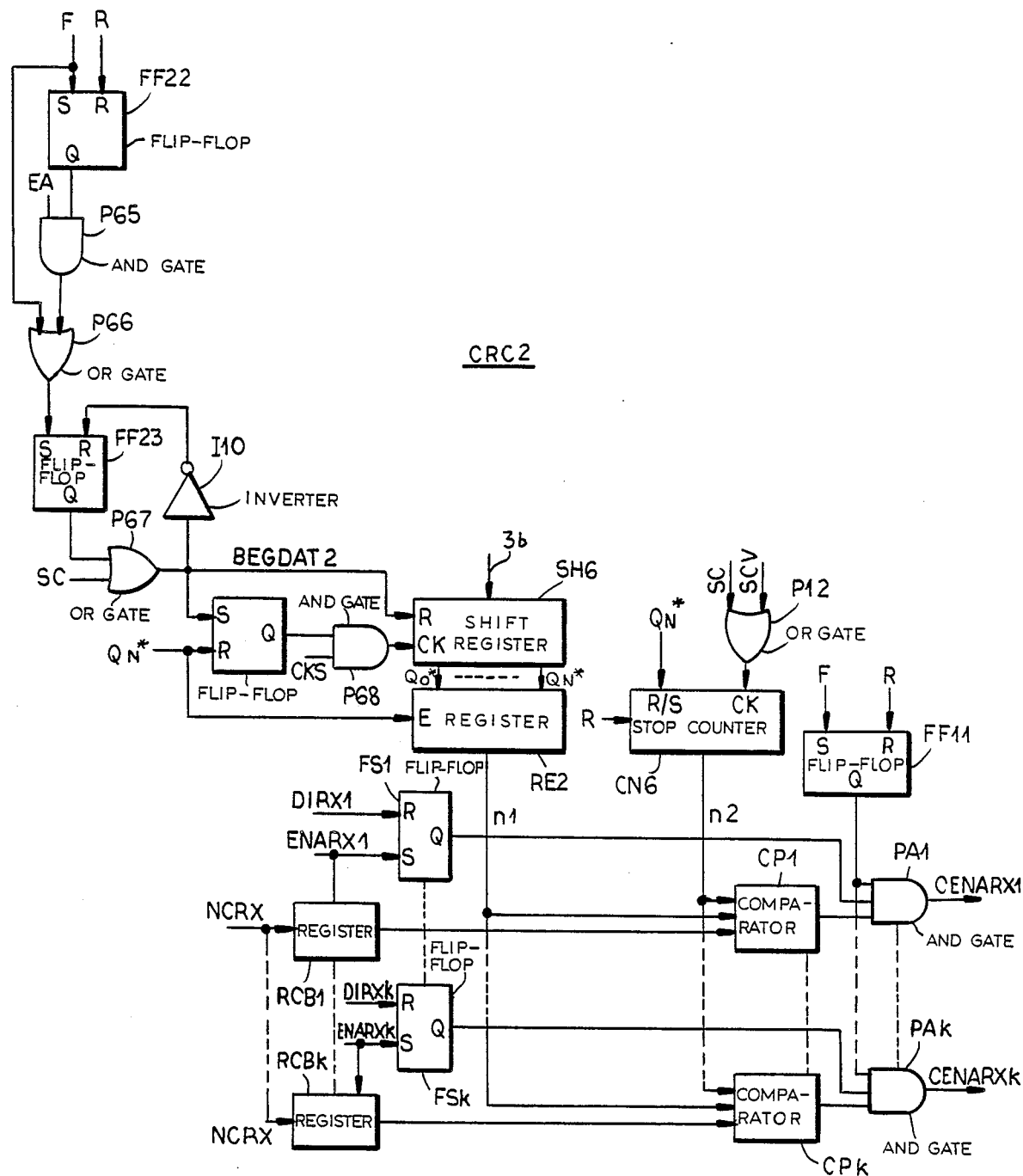

In FIG. 27, circuit CRC2 controlling the reception of circuit-switched information comprises the same devices as the reception manager logic CRC, apart from counter CN5 for the generation of n1, which is replaced by a logic network extracting and storing, at suitable instants, number n1 explicitly transmitted. For the description of this logic network it has been assumed that also the transmission of the bits of n1 is preceded by a signal SC.

A shift register SH6 connected to a wire $3b$ serially loads bits $Q^*_0 \ldots Q^*_N$ representing such number and supplies them to a register RE2, enabled to emit them after loading the last bit $Q^*_N$. The latter bit acts also as reset for counter CN6 in place of NODC which obviously is lacking.

Shift register SH6 is to operate only in the circuit region and to load only the bits indicated by the first signal SC. Circuit region is detected by a flip-flop FF22, set by F and reset by R. The signal present on output Q of flip-flop FF22 sets a second flip-flop FF23 through an AND gate P65 and an OR gate P66. Gate P65 is enabled by signal EA, and OR gate P66 receives at a second input signal F. Output Q of flip-flop FF23 enables an AND gate P67 to let through signal SC, which, owing to the preceding circuits, is the first of a transmission.

Signal SC is used as signal BEGDAT2 to reset shift register SH6 and to set a third flip-flop FF24, whose output Q enables an AND gate P68 to let through clock signals CKS controlling the shift in shift register SH6. Flip-flop FF23 is reset by signal BEGDAT2 with a certain delay, as indicated by inverter I10, and flip-flop FF24 is reset by $Q^*_N$.

As to the other blocks, circuit PRC2 is identical to PRC (FIG. 14), apart from the change of name of signals SF, SR. In FG2, the counter equivalent to counter CN8 (FIG. 18) is missing, the flip-flop corresponding to flip-flop FF13 is reset by TE and not by EAEP, since the right of access of a node is completely exploited only after the node has retransmitted the token, and the gate generating RE is enabled by signal T indicating the end of the circuits, since the master node sees again the token after the circuit activity of the last node.

It is clear that what is described is given only by way of example, and that variations and modifications are possible without departing from the scope of the invention.

For instance in the embodiment with fixed master node, signal ABOTR (FIG. 7) can be generated only by the master node and be sent to all the other nodes. This signal becomes then one of the frame signals. In this way block DT can be eliminated also in this embodiment.

In addition, in the embodiments in which the access right is recognized by the token-passing technique, the token can be implicit, i.e. a node recognizes the right of access because there is no activity after a signal EA. In this case the delay between reception and retransmission in the node is necessary to allow immediate transmission of signal SC by the active node without originating inactivity periods. Besides, the node is to store information indicating whether or not it has had the access during the current frame so as to distinguish between circuit or packet access.

We claim:

1. A method of asynchronously accessing a high-speed local area network having a ring-transmission line along which a plurality of nodes are arranged with each node being capable of signal regeneration, said method comprising the steps of:
    organizing information which is transmitted along said line into hybrid frames each having a circuit region in the form of a zone allotted to communications with information-continuity requirements and a packet region in the form of a zone allotted to communications which do not require continuity of information;
    effecting asynchronous access of the individual nodes for circuit and packet transmission along said line in sequence to said line in a given order and maintaining said order in both the circuit region and the packet region of each of said frames; and
    in the packet region of each frame, starting from an instant preceding by a predetermined time period the end of the frame, disabling the packet transmission of the node which has the right of transmission at that instant or of the nodes which would have the right of access from that instant to the end of the present frame, thereby avoiding overlapping between adjacent frames.

2. The method defined in claim 1 wherein said predetermined time period is equal to the time ($T_p$) necessary for the information emitted by a node to return over said ring-transmission line to the emitting node.

3. The method defined in claim 1 wherein after transmission is disabled, in the circuit region of a new frame, said nodes resume accessing of said line in the same order as in the previous frame.

4. The method defined in claim 3 wherein said time ($T_p$) is counted only in a master node of said plurality of nodes, and said master node at each frame sends disabling signals to the other nodes after a time ($Z-T_p$) has expired from the beginning of the frame, Z being frame duration.

5. The method defined in claim 2 wherein the recognition of the disabling instant is managed individually and independently by the individual nodes.

6. The method defined in claim 2, further comprising the steps of communicating the value ($T_p$) of the predetermined time period to all of said nodes during an initialization phase, and periodically updating said value with a network control center operatively connected to one of said nodes.

7. The method defined in claim 2, further comprising the steps of communicating the value ($T_p$) of the predetermined time period to all of said nodes during an initialization phase by a network control center, and periodically updating said value with a master node forming one of said plurality of nodes.

8. The method defined in claim 1 wherein master node functions are assigned during each frame to the one of said nodes whose packet transmission has been interrupted in the previous frame upon expiration of the predetermined time, or by the first node having a right of access after said instant when no node was then transmitting.

9. The method defined in claim 1 wherein each of said nodes emits at the end of its circuit or packet information, or in place of such information, a signal of end-of-activity, and access right recognition is effected by counting said signal or a guard time indicating an isolated or faulty node.

10. The method defined in claim 1, further comprising the step of effecting recognition of the access right of each of said nodes to said transmission line in response to the presence of a token in each frame transmitted along said line.

11. The method defined in claim 10 wherein the same token is used for recognition of the access right in both the circuit and the packet region of each frame.

12. The method defined in claim 10 wherein different tokens are used for recognition of the access right in the circuit and the packet regions of each frame.

13. The method defined in claim 1 wherein each active one of said nodes emits at the end or in place of its packet or circuit activity a signal of end-of-activity and recognizes the right of access from the lack of activity after the signal of end-of-activity, said method further comprising the step of storing in each node information indicating whether or not the respective node has had access during a particular frame to recognize whether access has occurred in the circuit or packet region.

14. A local area network, comprising a plurality of nodes each capable of signal regeneration, a ring-transmission line coupled to all of said nodes whereby information is transmitted along said line in hybrid frames each having a circuit region in the form of a zone allotted to communications with information-continuity requirements and a packet region in the form of a zone allotted to communications which do not require continuity of information, and wherein asynchronous access of the individual nodes is effected for circuit and packet transmission along said line in sequence to said line in a given order and said order is maintained in both the circuit region and the packet region of each of said frames, and wherein in the packet region of each frame, starting from an instant preceding by a predetermined time period the end of the frame, the packet transmission of the node which has the right of transmission at that instant or of the nodes which would have the right of access from that instant to the end of the present frame is disabled, thereby avoiding overlapping between adjacent frames, said nodes each having a line-access managing device comprising:

means for controlling reception and transmission of information relevant to packet-switched and/or circuit-switched communications;

means for recognizing a right of access to said line; and means for suppression of information which has completed travel along the ring formed by said line;

said line-access managing device of at least a master node forming one of said plurality of nodes further comprising:

a frame signal generator generating commands for sending over said line coded signals indicating significant events in the frame;

means for generating in the packet region of each frame a signal indicating the instant of the beginning of an interval of predetermined duration extending up to the frame end and constituting said predetermined time period;

means for disabling packet transmission by the nodes which have right of access during said interval; and a logic network recognizing the right of access of a node into said circuit region and into said packet region of said frame.

15. The local area network defined in claim 14 wherein the same node of said plurality of nodes always acts as said master node.

16. The local area network defined in claim 14 wherein said means for disabling is active only in the line-access managing device of said master node and consists of said frame generator constructed and arranged to broadcast a disabling signal to all of the other nodes.

17. The local area network defined in claim 14 wherein said means for disabling is active in each node and is constructed and arranged to generate a disabling signal only for the node containing the respective disabling means.

18. The local area network defined in claim 17 wherein said master node is the last node to have access during the frame, said disabling signal being represented by a command of emission of a start-of-frame flag for the master node and by an output signal of a counter of a time $(Z-T_p)$ for the other nodes, Z being frame duration and $T_p$ being said predetermined time period.

19. The local area network defined in claim 14 wherein the function of a master node in a frame is assumed by a node which was transmitting at the moment of emission of a disabling signal during the preceding frame, or in case no node was transmitting, by the first node having the right of access during said interval.

20. The local area network defined in claim 19 wherein the node which assumes the function of the master node transmits a start-of-frame flag together with a signal of the identity of the latter node.

21. The local area network defined in claim 20 wherein said disabling signal is a command of emission for said start-of-frame flag.

22. The local area network defined in claim 14 wherein said logic network recognizes in each of said regions of each frame the right of access of the node of the logic network by counting signals emitted by a circuit of said line-access management device able to recognize and signal an occurred access of a node or expiration of a guard time indicating impossibility of such access.

23. The local area network defined in claim 14 wherein said logic network recognizes in each of said regions of each frame the right of access of the node of the logic network on the basis of a token passing, said line-access managing device comprising means for signalling to said logic circuit the presence on said line of a token and the presence of information to be transmitted by the node in either region of the frame, and for controlling extraction from said line of the token and its re-emission over the line at the end of transmission of information by the respective node.

24. The local area network defined in claim 14 wherein said logic network recognizes in each of said regions of each frame the right of access of the node of the logic network because a signal indicating the end of activity of a node is not immediately followed by a signal indicating the beginning of the information relevant to a communication transmitted by another node, said logic circuit comprising means storing information indicating whether or not the node has already obtained the access in a current frame to make a distinction between access in the circuit region or access in the packet region.

* * * * *